US010206136B2

(12) United States Patent
Itoh et al.

(10) Patent No.: US 10,206,136 B2
(45) Date of Patent: Feb. 12, 2019

(54) COMMUNICATION APPARATUS, CONTROL APPARATUS, COMMUNICATION METHOD, CONTROL METHOD, AND PROGRAM

(71) Applicant: NEC Corporation, Tokyo (JP)

(72) Inventors: Nobuhiko Itoh, Tokyo (JP); Ippei Akiyoshi, Tokyo (JP); Yasuhiro Mizukoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 117 days.

(21) Appl. No.: 14/916,772

(22) PCT Filed: Sep. 5, 2014

(86) PCT No.: PCT/JP2014/004589
§ 371 (c)(1),
(2) Date: Mar. 4, 2016

(87) PCT Pub. No.: WO2015/033580
PCT Pub. Date: Dec. 3, 2015

(65) Prior Publication Data
US 2016/0212654 A1 Jul. 21, 2016

(30) Foreign Application Priority Data
Sep. 5, 2013 (JP) .................. 2013-183983

(51) Int. Cl.
H04W 28/02 (2009.01)
H04W 28/18 (2009.01)
(Continued)

(52) U.S. Cl.
CPC ....... H04W 28/0268 (2013.01); H04W 28/18 (2013.01); H04W 40/12 (2013.01);
(Continued)

(58) Field of Classification Search
CPC . H04W 28/18; H04W 28/0268; H04W 88/12; H04W 40/12; H04W 76/12; H04W 76/22
See application file for complete search history.

(56) References Cited

U.S. PATENT DOCUMENTS 8,908,601 B2 * 12/2014 Yin ....................... H04W 48/16
370/328
2007/0147341 A1 6/2007 Izumikawa et al.
(Continued)

FOREIGN PATENT DOCUMENTS

JP 2007-181003 7/2007
JP 2010-28422 2/2010
(Continued)

OTHER PUBLICATIONS

Telecom Italia et al., "New key issue on differentiated treatment for non-deducible service data flows in case of RAN user plane congestion", SA WG2 Meeting #96, S2-131491, [online], Internet URL:http://www.3gpp.org/ftp/tsg_sa/WG2_Arch/TSGS2_96_san_Diego/Docs/S2-131491.zip, pp. 1-2, Apr. 2013.
(Continued)

Primary Examiner — Ajay Cattungal
(74) Attorney, Agent, or Firm — Finnegan, Henderson, Farabow, Garrett & Dunner, L.L.P.

(57) ABSTRACT

A technique enabling diverse communication quality control for a communication service is provided. A communication apparatus includes a first means for storing a parameter notified from a control apparatus, wherein the control apparatus can send a control signal related to the communication path to the communication apparatus; and a second means that can perform communication quality control on a packet, based on a quality class of the communication path corresponding to the packet and the parameter corresponding to the communication path.

14 Claims, 45 Drawing Sheets

FIRST EXEMPLARY EMBODIMENT

(51) Int. Cl.
*H04W 88/12* (2009.01)
*H04W 40/12* (2009.01)
*H04W 76/22* (2018.01)
*H04W 76/12* (2018.01)

(52) U.S. Cl.
CPC ............ *H04W 88/12* (2013.01); *H04W 76/12* (2018.02); *H04W 76/22* (2018.02)

(56) References Cited

U.S. PATENT DOCUMENTS

| | | |
|---|---|---|
| 2010/0014532 A1 | 1/2010 | Wakayama et al. |
| 2012/0275367 A1 | 11/2012 | Ludwig et al. |
| 2014/0036778 A1 | 2/2014 | Awano et al. |
| 2016/0112896 A1* | 4/2016 | Karampatsis ..... H04W 28/0252 370/230.1 |

FOREIGN PATENT DOCUMENTS

| | | |
|---|---|---|
| JP | 2013-516094 | 5/2013 |
| WO | WO 2012/081215 A1 | 6/2012 |

OTHER PUBLICATIONS

3GPP TS 23.203 V12.1.0, $3^{rd}$ Generation Partnership Project; Technical Specification Group Services and System Aspects; Policy and charging control architecture (Release 12), Jun. 2013.
International Search Report and Written Opinion dated Nov. 25, 2014 in corresponding PCT International Application.

* cited by examiner

FIG. 3

QoS INFORMATION DB (FIRST EXAMPLE)

| PARAMETER | QCI | DSCP |
|---|---|---|
| A | 5 | 48 |
| B | 5 | 47 |
| A | 1 | 46 |
| B | 1 | 45 |
| ... | ... | ... |
| B | 9 | 0 |

FIG. 4

QoS INFORMATION DB (SECOND EXAMPLE)

| PARAMETER | QCI | DSCP |
|---|---|---|
| A | 5 | 48 |
| A | 1 | 47 |
| A | 3 | 46 |
| ... | ... | ... |
| B | 5 | 30 |
| B | 1 | 29 |
| B | 3 | 28 |
| ... | ... | ... |

FIG. 11

THIRD EXEMPLARY EMBODIMENT

QoS INFORMATION DB (FIRST EXAMPLE)

| PARAMETER (USER PROPERTY) | QCI | DSCP |
|---|---|---|
| PREMIUM USER | 5 | 48 |
| GENERAL USER | 5 | 47 |
| PREMIUM USER | 1 | 46 |
| GENERAL USER | 1 | 45 |
| ... | ... | ... |
| GENERAL USER | 9 | 0 |

FIG. 12

QoS INFORMATION DB (SECOND EXAMPLE)

| PARAMETER (USER PROPERTY) | QCI | DSCP |
|---|---|---|
| PREMIUM USER | 5 | 48 |
| PREMIUM USER | 1 | 47 |
| PREMIUM USER | 3 | 46 |
| ... | ... | ... |
| GENERAL USER | 5 | 30 |
| GENERAL USER | 1 | 29 |
| GENERAL USER | 3 | 28 |
| ... | ... | ... |

FIG. 20

FOURTH EXEMPLARY EMBODIMENT

QoS INFORMATION DB / QOS POLICY DB

| PARAMETER (USER PROPERTY) | QCI | DSCP |
|---|---|---|
| GENERAL USER | 5 | 48 |
| GENERAL USER | 1 | 47 |
| GENERAL USER | 3 | 46 |
| ... | ... | ... |
| HEAVY USER | 5 | 30 |
| HEAVY USER | 1 | 29 |
| HEAVY USER | 3 | 28 |
| ... | ... | ... |

FIG. 26

QoS INFORMATION DB / QoS POLICY DB (FIRST EXAMPLE)

| PARAMETER (CONGESTION LEVEL) | QCI | DSCP |
|---|---|---|
| 1 | 5 | 48 |
| 2 | 5 | 47 |
| 3 | 5 | 46 |
| 1 | 1 | 45 |
| 2 | 1 | 44 |
| 3 | 1 | 43 |
| ... | ... | ... |
| 1 | 6 | 25 |
| 2 | 6 | 15 |
| 3 | 6 | 0 |
| 1 | 7 | 24 |
| 2 | 7 | 14 |
| 3 | 7 | 0 |
| ... | ... | ... |

FIG. 27

QoS INFORMATION DB / QoS POLICY DB (SECOND EXAMPLE)

| CONGESTION LEVEL | PARAMETER | | |
|---|---|---|---|
| | USER PROPERTY | QCI | DSCP |
| ... | ... | ... | ... |
| 1 | GENERAL USER | 6 | 25 |
| 1 | PREMIUM USER | 6 | 26 |
| 2 | GENERAL USER | 6 | 15 |
| 2 | PREMIUM USER | 6 | 20 |
| 3 | GENERAL USER | 6 | 0 |
| 3 | PREMIUM USER | 6 | 15 |
| ... | ... | ... | ... |

FIG. 29

QoS INFORMATION DB / QoS POLICY DB (THIRD EXAMPLE)

| PARAMETER (DISASTER LEVEL) | QCI | DSCP |
|---|---|---|
| 1 | 5 | 48 |
| 2 | 5 | 47 |
| 3 | 5 | 46 |
| 1 | 1 | 45 |
| 2 | 1 | 44 |
| 3 | 1 | 43 |
| ... | ... | ... |
| 1 | 6 | 25 |
| 2 | 6 | 15 |
| 3 | 6 | 0 |
| 1 | 7 | 24 |
| 2 | 7 | 14 |
| 3 | 7 | 0 |
| ... | ... | ... |

FIG. 30

QoS INFORMATION DB / QoS POLICY DB (FOURTH EXAMPLE)

| PARAMETER | | | |
|---|---|---|---|
| DISASTER LEVEL | USER PROPERTY | QCI | DSCP |
| ... | ... | ... | ... |
| 1 | GENERAL USER | 6 | 25 |
| 1 | PREMIUM USER | 6 | 26 |
| 2 | GENERAL USER | 6 | 15 |
| 2 | PREMIUM USER | 6 | 20 |
| 3 | GENERAL USER | 6 | 0 |
| 3 | PREMIUM USER | 6 | 15 |
| ... | ... | ... | ... |

FIG. 33

QoS INFORMATION DB / QoS POLICY DB

| PARAMETER (PROVIDER PROPERTY) | QCI | DSCP |
|---|---|---|
| ... | ... | ... |
| N/A | 6 | 25 |
| GENERAL CONTRACT | 6 | 25 |
| PREMIUM CONTRACT | 6 | 35 |
| ... | ... | ... |

FIG. 35

QoS INFORMATION DB / QoS POLICY DB

| PARAMETER (MVNO ID) | QCI | DSCP |
|---|---|---|
| ... | ... | ... |
| N/A | 6 | 25 |
| MVNO(A) | 6 | 20 |
| MVNO(B) | 6 | 25 |
| ... | ... | ... |

FIG. 36

QoS INFORMATION DB / QoS POLICY DB

| PARAMETER (MVNO PROPERTY) | QCI | DSCP |
|---|---|---|
| ... | ... | ... |
| N/A | 6 | 25 |
| GENERAL | 6 | 20 |
| PREMIUM | 6 | 25 |
| ... | ... | ... |

EIGHTH EXEMPLARY EMBODIMENT

FIG. 40

BEARER INFORMATION DB

| BEARER IDENTIFICATION INFORMATION | QCI | TERMINAL ID |
|---|---|---|
| TEID #1 | 5 | IMSI #1 |
| TEID #2 | 5 | IMSI #2 |
| TEID #3 | 1 | IMSI #3 |
| TEID #4 | 1 | IMSI #4 |
| ... | ... | ... |
| TEID #X | 9 | IMSI #X |

FIG. 41

PARAMETER DB

| TERMINAL ID | PARAMETER |
|---|---|
| IMSI #1 | A |
| IMSI #2 | B |
| IMSI #3 | C |
| IMSI #4 | D |
| ... | ... |
| IMSI #X | X |

FIG. 42

EXAMPLE OF CORRESPONDENCE BETWEEN
BEARER IDENTIFICATION INFORMATION AND PARAMETER

| BEARER IDENTIFICATION INFORMATION | PARAMETER |
|---|---|
| TEID # 1 | A |
| TEID # 2 | B |
| TEID # 3 | C |
| TEID # 4 | D |
| ... | ... |
| TEID # X | X |

COMMUNICATION APPARATUS, CONTROL APPARATUS, COMMUNICATION METHOD, CONTROL METHOD, AND PROGRAM

CROSS-REFERENCE TO RELATED PATENT APPLICATIONS

This application is a National Stage Entry of International Application No. PCT/JP2014/004589, filed Sep. 5, 2014, which claims priority from Japanese Patent Application No. 2013-183983, filed Sep. 5, 2013. The entire contents of the above-referenced applications are expressly incorporated herein by reference.

TECHNICAL FIELD

The present invention relates to a communication system in which communication is performed over a communication path between communication apparatuses and, more particularly, to control of QoS corresponding to a communication path.

BACKGROUND ART

In a mobile communication system, a communication terminal such as a mobile telephone connects to a base station and thereby can access the Internet via a core network. The communication terminal performs communication over a communication path (e.g., a bearer) established with an apparatus (e.g., a gateway) provided in the core network.

In order to construct the bearer, the base station and the gateway construct a tunnel by encapsulating a packet. In order to construct the tunnel, the base station and the gateway add QoS (Quality of Service) information to the packet. Communication apparatuses in the mobile communication system can perform packet forwarding control (e.g., communication quality control), based on the QoS information added to the packet.

NPL 1 discloses a technique related to QoS control in a mobile communication system. In NPL 1, table 6.1.7 discloses a correspondence between a communication service and a QCI (QoS Class Identifier). For example, when constructing a GTP (GPRS Tunneling Protocol) tunnel corresponding to a bearer, a gateway apparatus and a base station add QoS information (e.g., DSCP (Differentiated Service Code Point)) associated with the QCI of the bearer to a packet. The gateway apparatus and the base station add QoS information to a packet, thereby performing communication quality control on the packet.

CITATION LIST

Non-Patent Literature

[NPL 1]
3GPP TS23.203 V12.1.0 "Technical Specification Group Services and System Aspects; Policy and charging control architecture", [retrieved on Aug. 30, 2013] Internet <http://www.3gpp.org/ftp/Specs/html-info/23203.htm>

SUMMARY OF INVENTION

Technical Problem

In table 6.1.7 of NPL 1, a communication service is paired with a specific QCI. Since specific QoS information is associated with each QCI, communication quality control for a communication service depends on the QCI paired with the communication service. Consequently, it is difficult to provide control of various communication qualities for a communication service.

An object of the present invention is to provide a technique enabling diverse communication quality control for a communication service.

Solution to Problem

A communication apparatus of the present invention is a communication apparatus that performs communication over a communication path set up in a network, includes: a first means for storing a parameter notified from a control apparatus, wherein the control apparatus can send a control signal related to the communication path to the communication apparatus; and a second means that can perform communication quality control on a packet, based on a quality class of the communication path corresponding to the packet and the parameter corresponding to the communication path.

A control apparatus of the present invention includes: a communication interface for sending a control signal related to a communication path set up in a network to a communication apparatus; and a control means for notifying a parameter by using the control signal to the communication apparatus, wherein the communication apparatus can perform communication quality control on a packet based on a quality class of the communication path corresponding to the packet and the parameter corresponding to the communication path.

A communication method of the present invention is a communication method for a communication apparatus that performs communication over a communication path set up in a network, include: storing a parameter notified from a control apparatus, wherein the control apparatus can send a control signal related to the communication path to the communication apparatus; and performing communication quality control on a packet, based on a quality class of the communication path corresponding to the packet and the parameter corresponding to the communication path.

A control method of the present invention is a control method includes: sending a control signal related to a communication path set up in a network to a communication apparatus; and notifying a parameter by using the control signal to the communication apparatus, wherein the communication apparatus can perform communication quality control on a packet based on a quality class of the communication path corresponding to the packet and the parameter corresponding to the communication path.

A program of the present invention causes a computer to execute: processing for sending a control signal related to a communication path set up in a network to a communication apparatus; and processing for notifying a parameter by using the control signal to the communication apparatus, wherein the communication apparatus can perform communication quality control on a packet based on a quality class of the communication path corresponding to the packet and the parameter corresponding to this communication path.

Advantageous Effects of Invention

According to the present invention, it is possible to provide a technique enabling diverse communication quality control for a communication service.

BRIEF DESCRIPTION OF DRAWINGS

FIG. 3 is a schematic structural diagram showing a first example of a QoS information database in the first exemplary embodiment.

FIG. 4 is a schematic structural diagram showing a second example of the QoS information database in the first exemplary embodiment.

FIG. 11 is a schematic structural diagram showing a first example of a QoS information database in a third exemplary embodiment of the present invention.

FIG. 12 is a schematic structural diagram showing a second example of the QoS information database in the third exemplary embodiment.

FIG. 20 is a schematic structural diagram showing an example of a QoS information/QoS policy database in a fourth exemplary embodiment of the present invention.

FIG. 26 is a schematic structural diagram showing a first example of a QoS information/QoS policy database in the fifth exemplary embodiment.

FIG. 27 is a schematic structural diagram showing a second example of the QoS information/QoS policy database in the fifth exemplary embodiment.

FIG. 29 is a schematic structural diagram showing a third example of the QoS information/QoS policy database in the fifth exemplary embodiment.

FIG. 30 is a schematic structural diagram showing a fourth example of the QoS information/QoS policy database in the fifth exemplary embodiment.

FIG. 33 is a schematic structural diagram showing an example of a QoS information/QoS policy database in the sixth exemplary embodiment.

FIG. 35 is a schematic structural diagram showing a first example of a QoS information/QoS policy database in the seventh exemplary embodiment.

FIG. 36 is a schematic structural diagram showing a second example of the QoS information/QoS policy database in the seventh exemplary embodiment.

FIG. 40 is a schematic structural diagram showing an example of a bearer information database in the eighth exemplary embodiment.

FIG. 41 is a schematic structural diagram showing an example of a parameter database in the eighth exemplary embodiment.

FIG. 42 is a diagram showing an example of the correspondence between bearer identification information and parameter in the eighth exemplary embodiment.

DESCRIPTION OF EMBODIMENTS

Hereinafter, exemplary embodiments of the present invention will be described. Each embodiment is shown for illustration, and the present invention is not limited to such exemplary embodiments.

1. First Exemplary Embodiment

A first exemplary embodiment of the present invention will be described.

1.1) System

Figure 1:
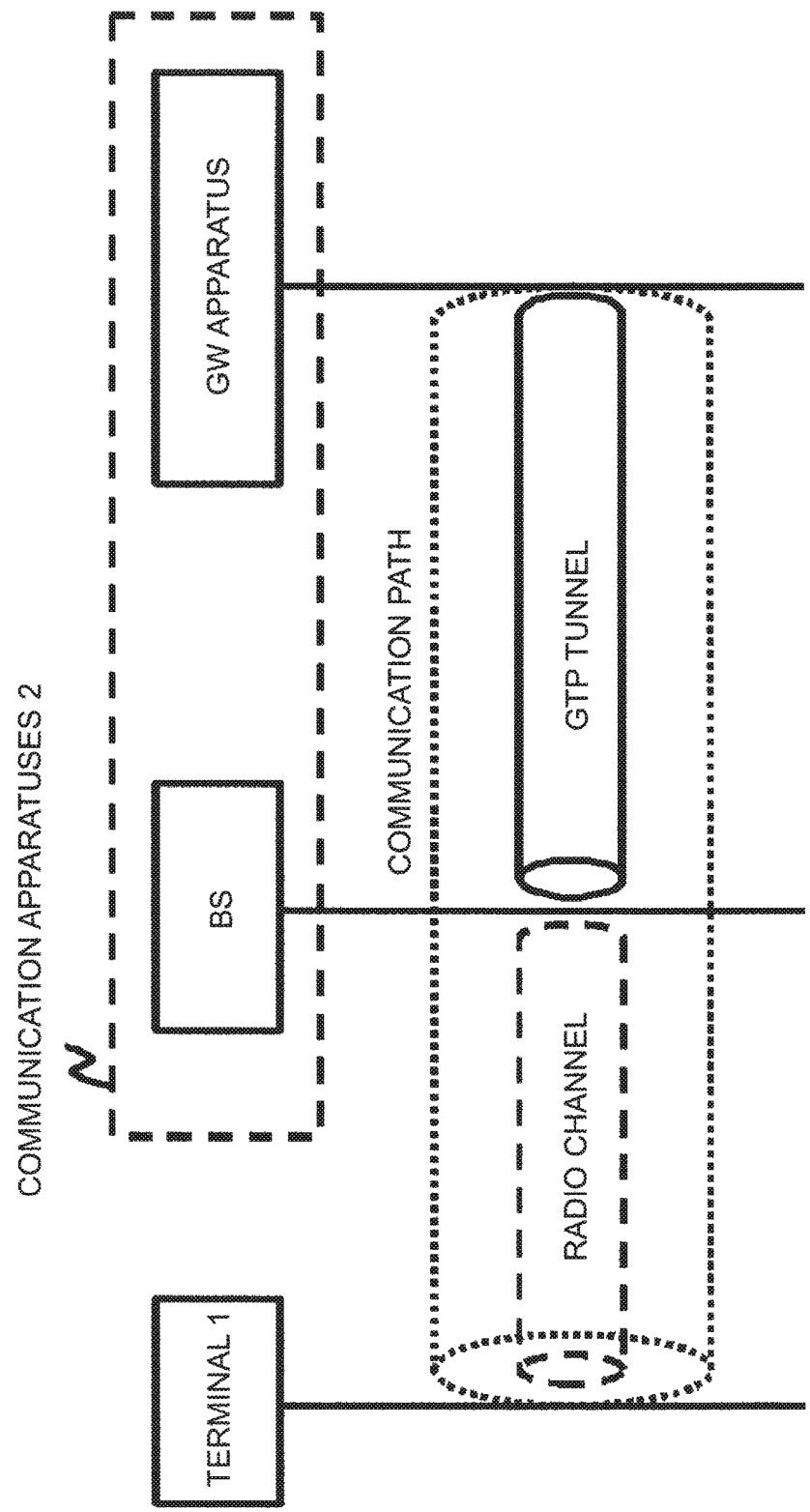
FIG. 1 is a diagram showing an example of the architecture of a system according to a first exemplary embodiment of the present invention.

FIG. 1 shows an outline of a communication system related to the present invention.

The communication system includes a terminal 1 such as a mobile telephone, a PC (Personal Computer), or a mobile router, and communication apparatuses 2 such as a base station and a gateway apparatus. The base station, for example, provides a radio access function for the terminal 1. The gateway apparatus, for example, provides a function as a connection point with an external network (e.g., the Internet).

The terminal 1 sends and receives data through a communication path (e.g., a bearer) constructed between the terminal 1 and the communication apparatuses 2. The communication path is composed of, for example, a radio channel constructed between the terminal 1 and the base station, a GTP tunnel with the gateway apparatus as an endpoint, and the like.

The QoS property of the communication path is defined by using, for example, QCI. QCI values are scalar values for identifying the QoS classes of communication paths. Each QCI stipulates the priority level, packet delay, packet loss rate, and the like of a packet belonging to a communication path.

The gateway apparatus and the base station each have a function of encapsulating a packet in order to construct a GTP tunnel. When encapsulating a packet, the gateway apparatus and the base station can add QoS information (e.g., DSCP) corresponding to a QCI to the packet. The gateway apparatus and the base station add QoS information corresponding to a bearer to a packet, thereby performing communication quality control on the packet. Note that the QoS information is not limited to DSCP but may be other Information related to QoS such as, for example, CoS (Class of Service) or PCP (Priority Code Point), which is a VLAN (Virtual Local Area Network) tag. Communication devices such as switches and routers that are present on a packet forwarding route perform packet sequencing control, communication bandwidth limitation, and the like, depending on a priority level corresponding to the QoS information added to the packet.

The communication apparatuses 2 (the gateway apparatus, the base station) according to the present exemplary embodiment can add to a packet QoS information that is selected from among a plurality of pieces of QoS information associated with the QCI of a communication path. Since QoS information to be added to a packet is selected from among a plurality of pieces of QoS information associated with a QCI, the communication system according to the present exemplary embodiment makes it possible to perform diverse communication quality control without depending only on QCI.

1.2) Communication Apparatus

Figure 2:
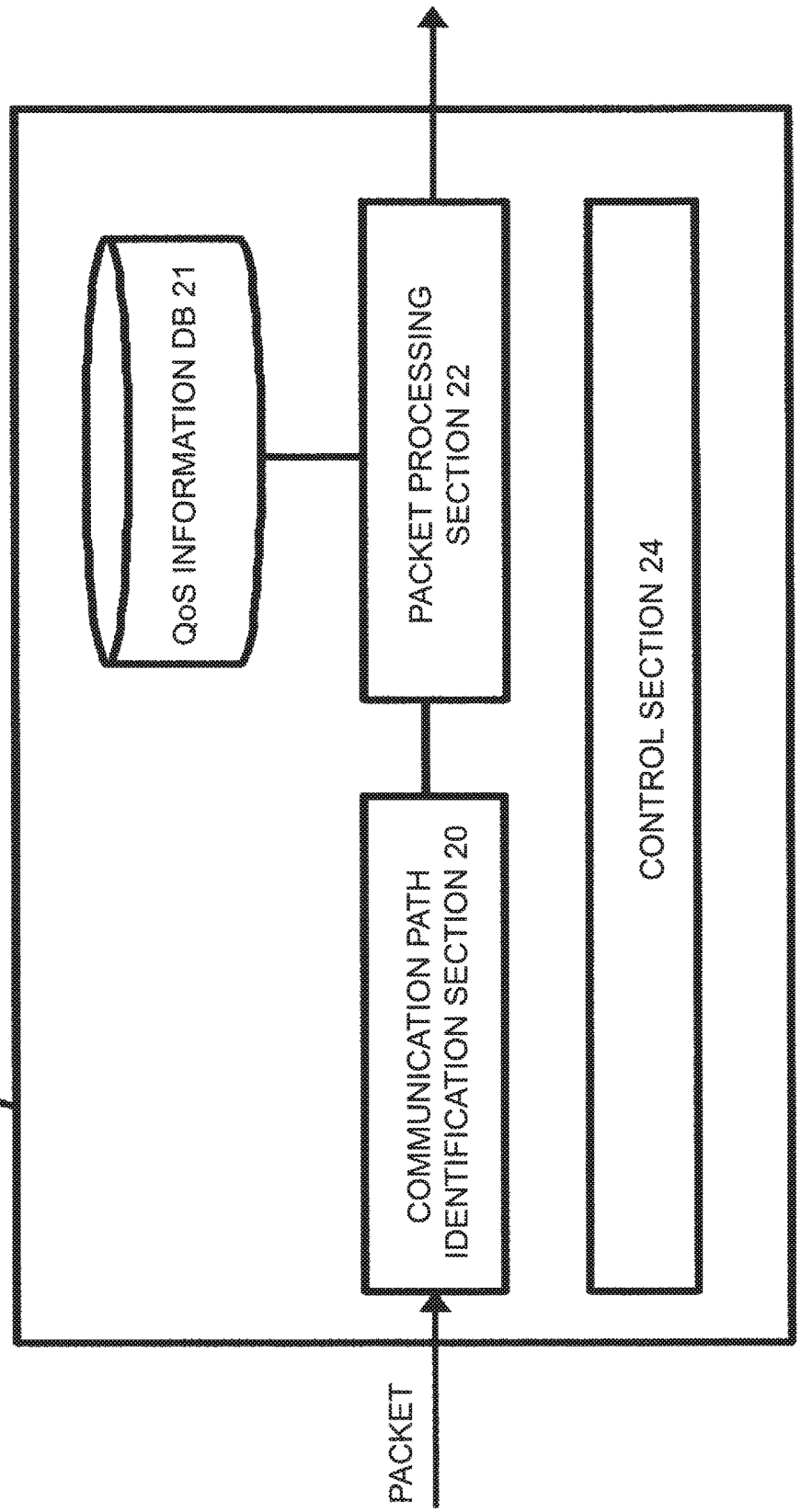
FIG. 2 is a block diagram showing an example of the configuration of a communication apparatus according to the first exemplary embodiment.

FIG. 2 shows an example of the configuration of a communication apparatus 2 according to the first exemplary embodiment.

The communication apparatus 2 includes a communication path identification section 20, a QoS information DB (Data Base) 21, a packet processing section 22, and a control section 24.

The communication path identification section 20 identifies a communication path to which a received packet belongs. For example, the communication path identification section 20 refers to information (e.g., Layer 3/Layer 4 information in the OSI reference model, such as IP address and port number) included in a packet, thereby identifying a communication path to which the packet belongs.

The packet processing section 22 adds QoS information, which is selected from among a plurality of pieces of QoS information associated with the identified communication path, to the packet. For example, the packet processing section 22 adds QoS information selected depending on a bearer type to the packet. For example, the packet processing section 22 identifies a bearer type in accordance with a predetermined criterion. For example, the packet processing section 22 identifies a bearer type based on the source and destination IP addresses of the packet and adds QoS information selected depending on the identified type to the packet.

The packet processing section 22 may select QoS information from the QoS information DB 21, based on the QCI of the identified communication path and a parameter, which is an indicator for selecting QoS information, and add the selected QoS information to the packet. The packet processing section 22 may select QoS information, based on a preset parameter. Moreover, the packet processing section 22 may receive from the communication path identification section 20 a parameter corresponding to the communication path identified by the communication path identification section 20, and select QoS information based on the received parameter. Note that the parameter is, for example, a parameter related to the priority of a packet.

The control section 24 can execute a function according to the type of the communication apparatus 2. In case where the communication apparatus 2 is a base station, the control section 24 executes a function of wirelessly communicating with the terminal 1, and the like. Moreover, in case where the communication apparatus 2 is a gateway function, the control section 24 performs a function of communicating with another communication apparatus 2 to set up the communication path, and the like.

FIGS. 3 and 4 show first and second configuration examples of the QoS information DB 21, respectively. Note that FIGS. 3 and 4 show examples in case where QoS information is selected based on a QCI and a parameter, but the present invention is not limited to these examples.

In the QoS information DB 21, a plurality of pieces of QoS information (here, DSCP) are associated with each QCI, and each of the plurality of pieces of QoS information associated with a QCI is associated with a parameter for selecting the QoS information, as illustrated in FIGS. 3 and 4. The first example shown in FIG. 3 represents a table with an arrangement prioritizing the QCI values, whereas the second example shown in FIG. 4 represents a table with an arrangement prioritizing the parameter values. For example, in the first example shown in FIG. 3, DSCP values of "48"

and "47" are associated with a QCI value of "5", and further, under the QCI value "5", the DSCP value "48" is associated with a parameter value of "A" and the DSCP value "47" is associated with a parameter value of "B". In the second example shown in FIG. 4, similarly, for example, DSCP values of "46" and "28" are associated with a QCI value of "3", and although associated with the same QCI value "3", the DSCP value "46" is associated with a parameter value of "A" and the DSCP value "28" is associated with a parameter value of "B". Thus, QoS information is selected based on a QCI value and a parameter value.

Note that it is not necessary that a plurality of pieces of QoS information should be associated with every QCI, but it is possible that a plurality of pieces of QoS information are associated with some of QCIs. The same will apply to other exemplary embodiments, which will be described later.

The packet processing section 22 retrieves a DSCP from the QoS information DB 22 by using the QCI of the communication path and the parameter notified from the communication path identification section 20 as keys. For example, in the example of FIG. 3, when the QCI is "5" and the parameter is "A", the packet processing section 22 retrieves a DSCP value of "48". The packet processing section 22 adds the retrieved DSCP value to the packet and forwards the packet.

1.3) Communication Quality Control

Figure 5:
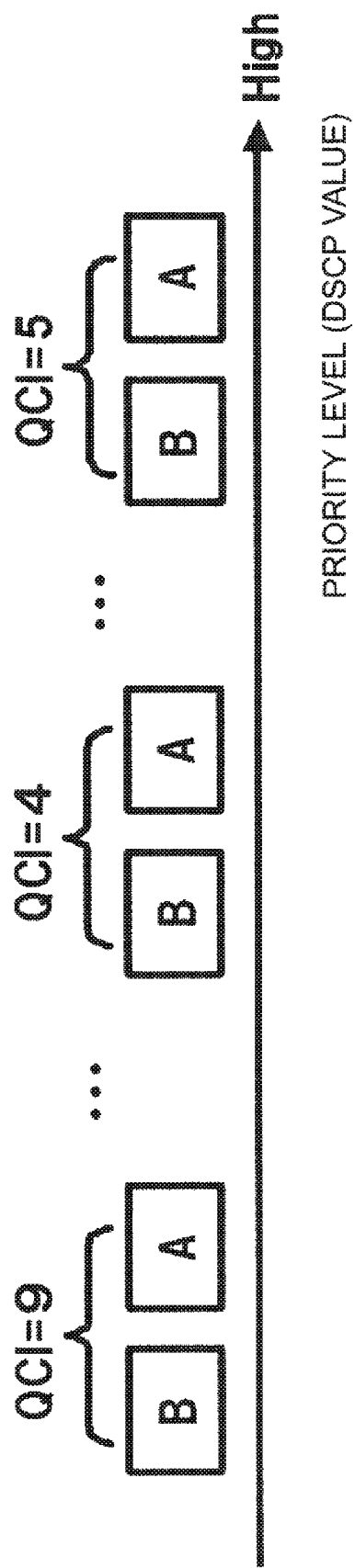
FIG. 5 is a schematic diagram showing a first example of communication quality control operation in the first exemplary embodiment.
Figure 6:
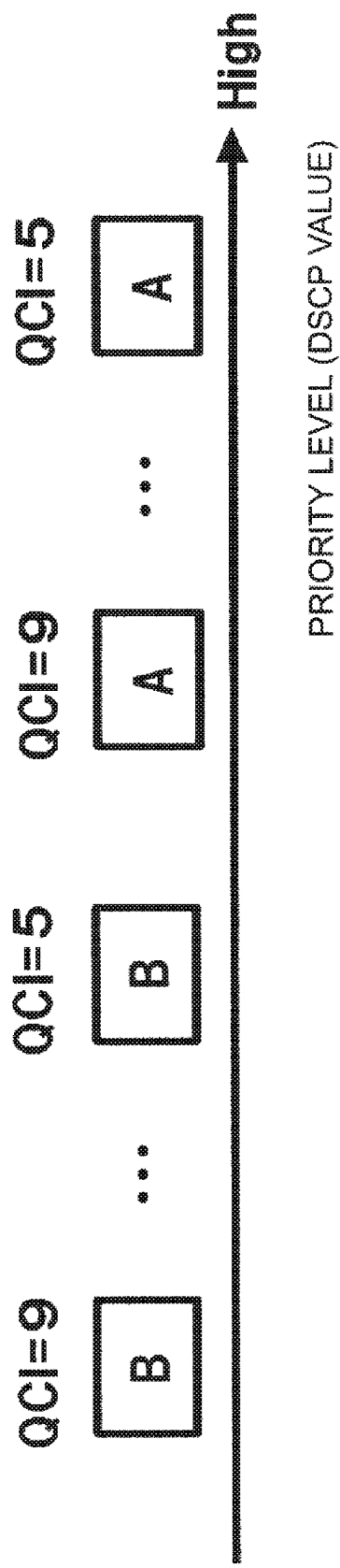
FIG. 6 is a schematic diagram showing a second example of the communication quality control operation in the first exemplary embodiment.

The communication apparatus 2 can perform diverse communication quality control, depending on the configuration of the QoS information DB 21 as described above. FIGS. 5 and 6 show examples of the communication quality control by the communication apparatus 2.

The example of FIG. 5 shows an example of communication quality control based on a QCI in preference to a parameter.

Priory levels are set on the QCIs and the parameters, individually. For example, a packet of QCI value "5" has the highest priority, and a packet of QCI value "9" has the lowest priority. Moreover, a packet of parameter "A" has higher priority than a packet of parameter "B".

The communication apparatus 2 performs communication quality control such that, of the QCI priority levels and the parameter priority levels, the communication apparatus 2 prioritizes the QCI priority levels and, in case of the same QCI priority level, follows the parameter priority levels, as illustrated in FIG. 5. More specifically, a packet of a higher-priority-level QCI value is assigned a larger DSCP value, and if there are a plurality of packets having the same QCI priority level, a packet of a higher-priority-level parameter is assigned a larger DSCP value. For example, a packet of QCI value "5" is assigned a larger DSCP value than a packet of QCI value "4", and if packets have the same QCI value "5", a packet of parameter "A" is assigned a larger DSCP value than a packet of parameter "B".

The example of FIG. 6 shows an example of communication quality control based on a parameter in preference to a QCI.

The communication apparatus 2 performs communication quality control such that, of the QCI priority levels and the parameter priority levels, the communication apparatus 2 prioritizes the parameter priority levels and, in case of the same parameter priority level, follows the QCI priority levels, as illustrated in FIG. 6. More specifically, a packet of a higher-priority-level parameter value is assigned a larger DSCP value, and if there are a plurality of packets having the same parameter priority level, a packet of a higher-priority-level QCI value is assigned a larger DSCP value. For example, a packet of parameter value "A" is assigned a larger DSCP value than a packet of parameter value "B", and if packets have the same parameter value "A", a packet of QCI value "5" is assigned a larger DSCP value than a packet of QCI value "4".

The communication apparatuses 2 can perform diverse communication quality control that does not only depend on QCI, as in the above-described examples.

1.4) Operations

Figure 7:
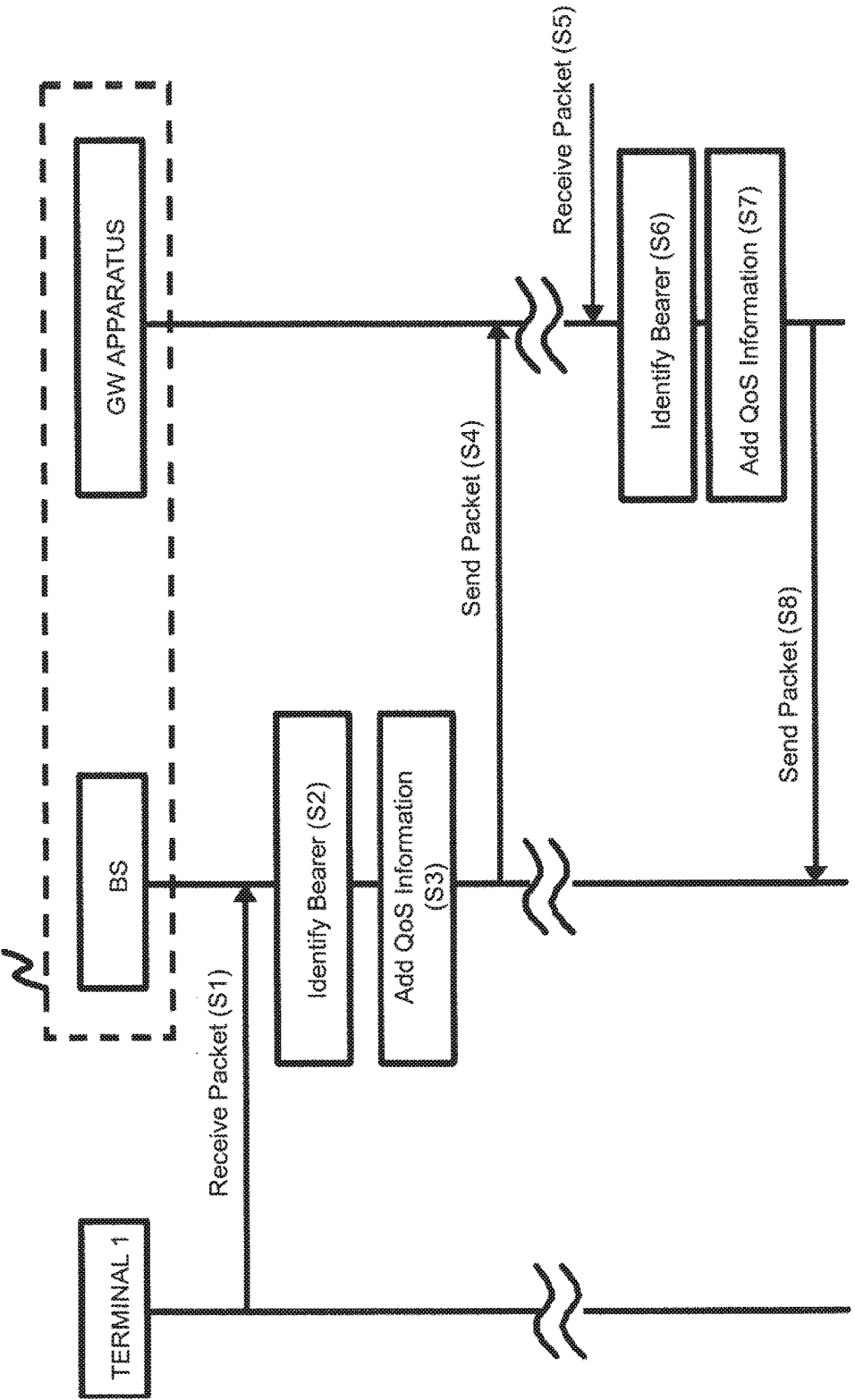
FIG. 7 is a sequence diagram showing an example of operations in the communication system according to the first exemplary embodiment.

FIG. 7 shows an example of operations according to the first exemplary embodiment.

The base station, when receiving a packet from the terminal 1 (Operation S1), identifies a communication path to which this packet belongs (Operation S2).

The base station adds QoS information (e.g., a DSCP value), which is selected based on a QCI corresponding to the identified communication path and a packet-priority-related parameter, to the packet (Operation S3) and forwards to the gateway apparatus the packet to which the QoS information is added (Operation S4).

The gateway apparatus, when receiving a packet (Operation S5), identifies a communication path to which this packet belongs (Operation S6).

The gateway apparatus adds QoS information (e.g., a DSCP value), which is selected based on a QCI corresponding to the identified communication path and a packet-priority-related parameter, to the packet (Operation S7) and forwards to the base station the packet to which the QoS information is added (Operation S8).

2. Second Exemplary Embodiment

A second exemplary embodiment of the present invention will be described. The second exemplary embodiment can be applied to the technique disclosed in the above-described first exemplary embodiment.

According to the second exemplary embodiment, a control apparatus can perform centralized control of the communication quality control performed by communication apparatuses, whereby the efficiency in system operation can be enhanced. In the present exemplary embodiment, a LTE (Long Term Evolution) system will be shown as an example, but the present exemplary embodiment is not limited to this system.

2.1) System

Figure 8:
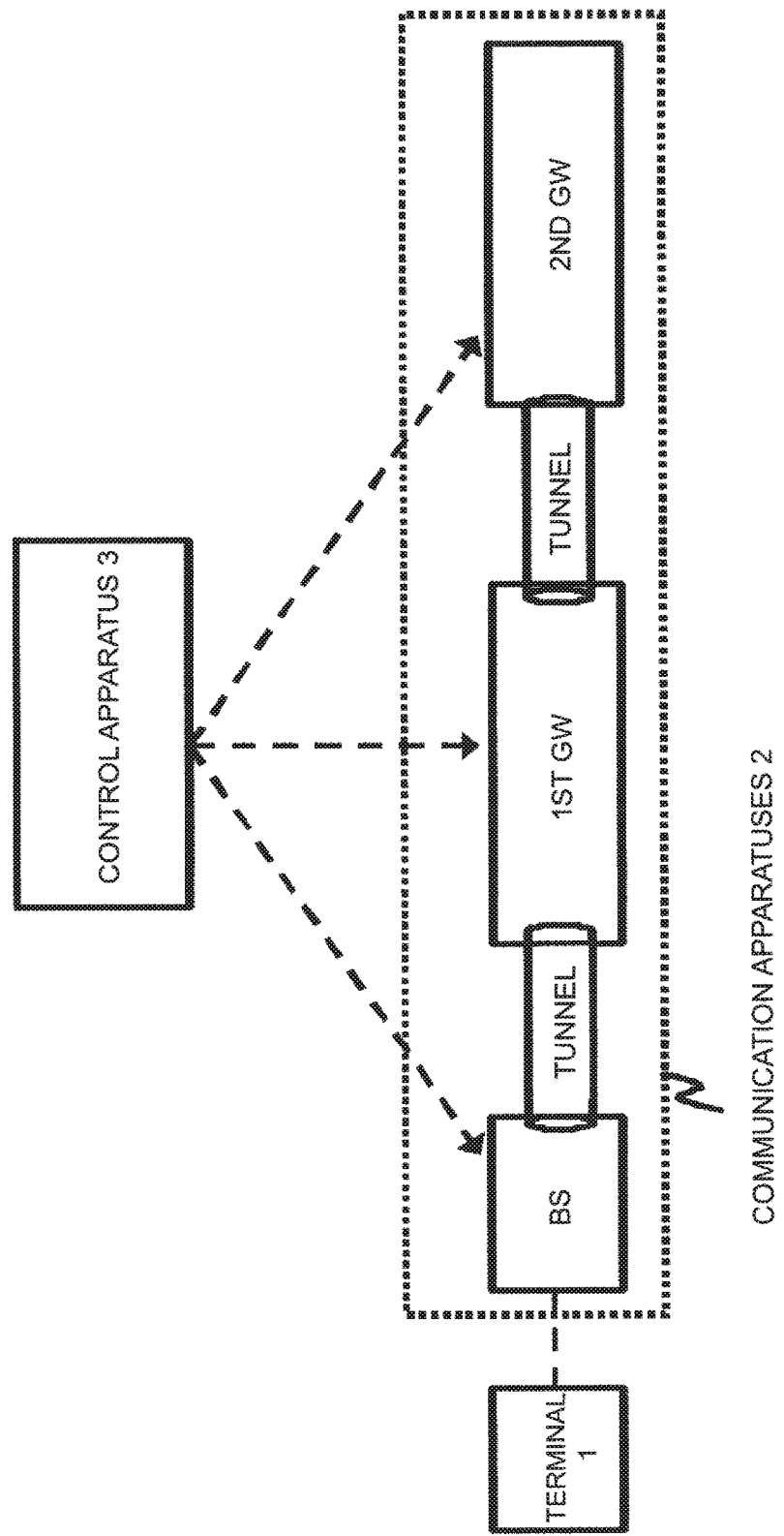
FIG. 8 is a diagram showing an example of the architecture of a system according to a second exemplary embodiment of the present invention.

Referring to FIG. 8, a system according to the second exemplary embodiment includes a terminal 1, communication apparatuses 2, and a control apparatus 3. Each communication apparatus 2 basically has the configuration shown in FIG. 2 and is assumed to be any one of an eNB (eNodeB), a serving gateway (S-GW), and a packet data network gateway (P-GW). The eNB is a base station wirelessly communicating with the terminal 1. The S-GW has a function of routing and forwarding a data packet and a function serving as an anchor when the terminal 1 is handed over between eNBs. The P-GW has a function of connecting with an external network (PDN).

In the present exemplary embodiment, the control apparatus 3 controls the execution of communication quality control by the communication apparatuses 2. Moreover, for example, the control apparatus 3 sends a control signal to the communication apparatuses 2 and thereby can manipulate the QoS information DB 21 of each communication apparatus 2.

The control apparatus 3 can be configured by using, for example, PCRF (Policy and Charging Rule Function), MME (Mobility Management Entity), and the like in the LTE communication system. Moreover, it is also possible to use NMS (Network Management System) to configure the control apparatus 3. The MME has a function of controlling the establishment and deletion of a bearer. Moreover, the MME has a function for mobility control on the terminal 1 such as handover, user authentication of the terminal 1, and the like. The PCRF has a function for charging control on data transfer, and the like. The NMS has a function for network traffic monitoring, alive monitoring on network devices, and the like.

Figure 9:
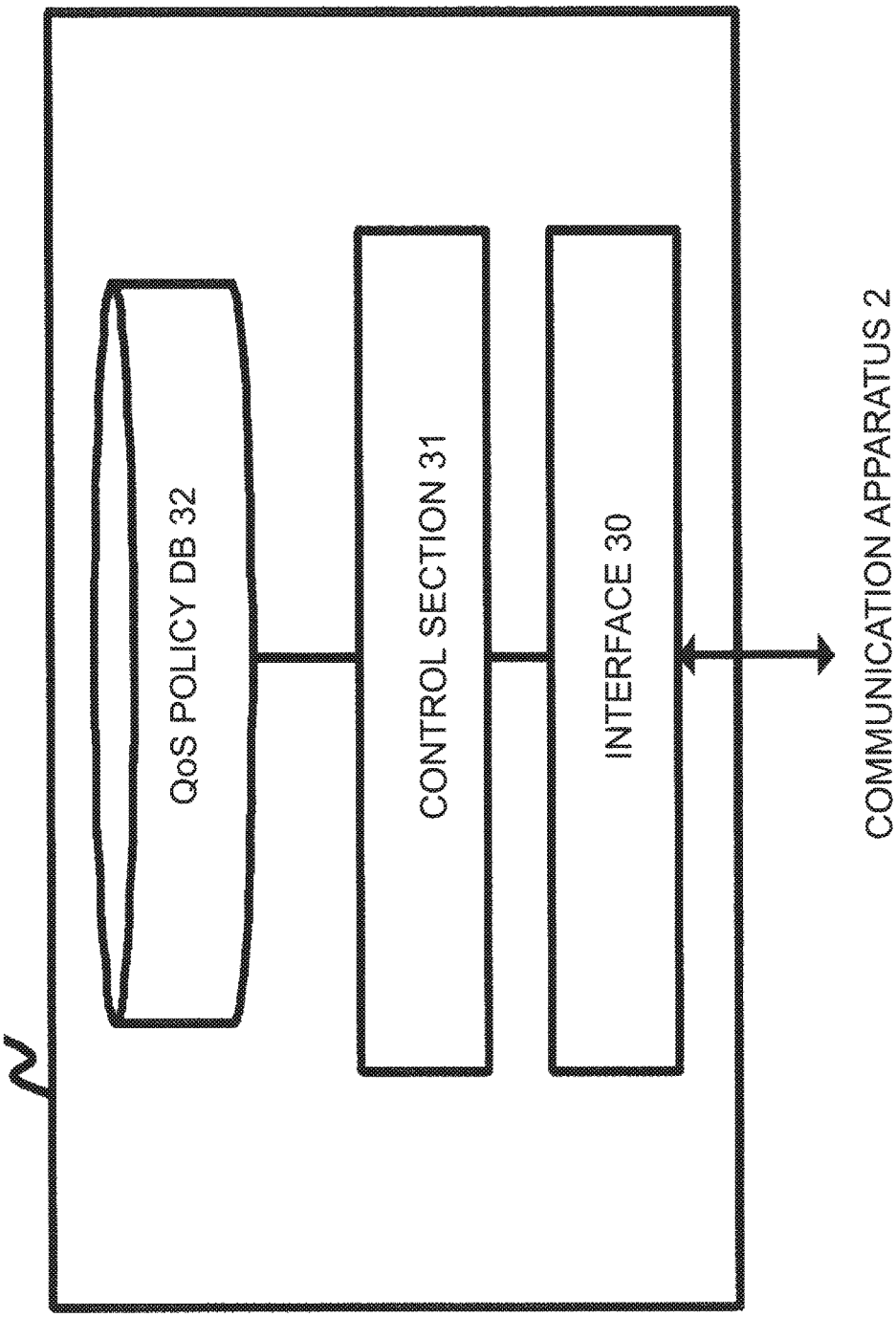
FIG. 9 is a block diagram showing an example of the configuration of a control apparatus according to the second exemplary embodiment.

FIG. 9 shows an example of the configuration of the control apparatus 3.

The control apparatus 3 includes an interface 30, a control section 31, and a QoS policy DB (Data Base) 32.

The interface 30 has a function of communicating with the communication apparatuses 2.

The control section 31 refers to the QoS policy DB 32 and manipulates the QoS information DBs 21 of the communication apparatuses 2. The control section 31 manipulates the QoS information DBs 21 of the communication apparatuses 2 via the interface 30.

The QoS policy DB 32 is, for example, a database set by the operator of the system. For example, the QoS policy DB 32 includes a database with the configuration illustrated in FIG. 3 or 4. For example, the operator of the system determines DSCP values to be associated with packet-priority-related parameters and QCIs and sets them in the QoS policy DB 32. Alternatively, the control section 31 may set the QoS policy DB 32 in accordance with predetermined communication quality control policies, without depending on the operator's manipulation.

The control section 31 refers to the database set in the QoS policy DB 32 and manipulates the QoS information DBs 21 of the communication apparatuses 2. For example, the control section 31, in response to an update of the QoS policy DB 32, manipulates the QoS information DBs 21 of the communication apparatuses 2 so that this update will be reflected. For example, the control section 31 may manipulate the QoS information DBs 21 by notifying the communication apparatuses 2 of the contents stored in the QoS policy DB 32 or of updated information (e.g., a plurality of pieces of QoS information that are associated with a QCI, depending on a parameter).

2.2) Operations

Figure 10:
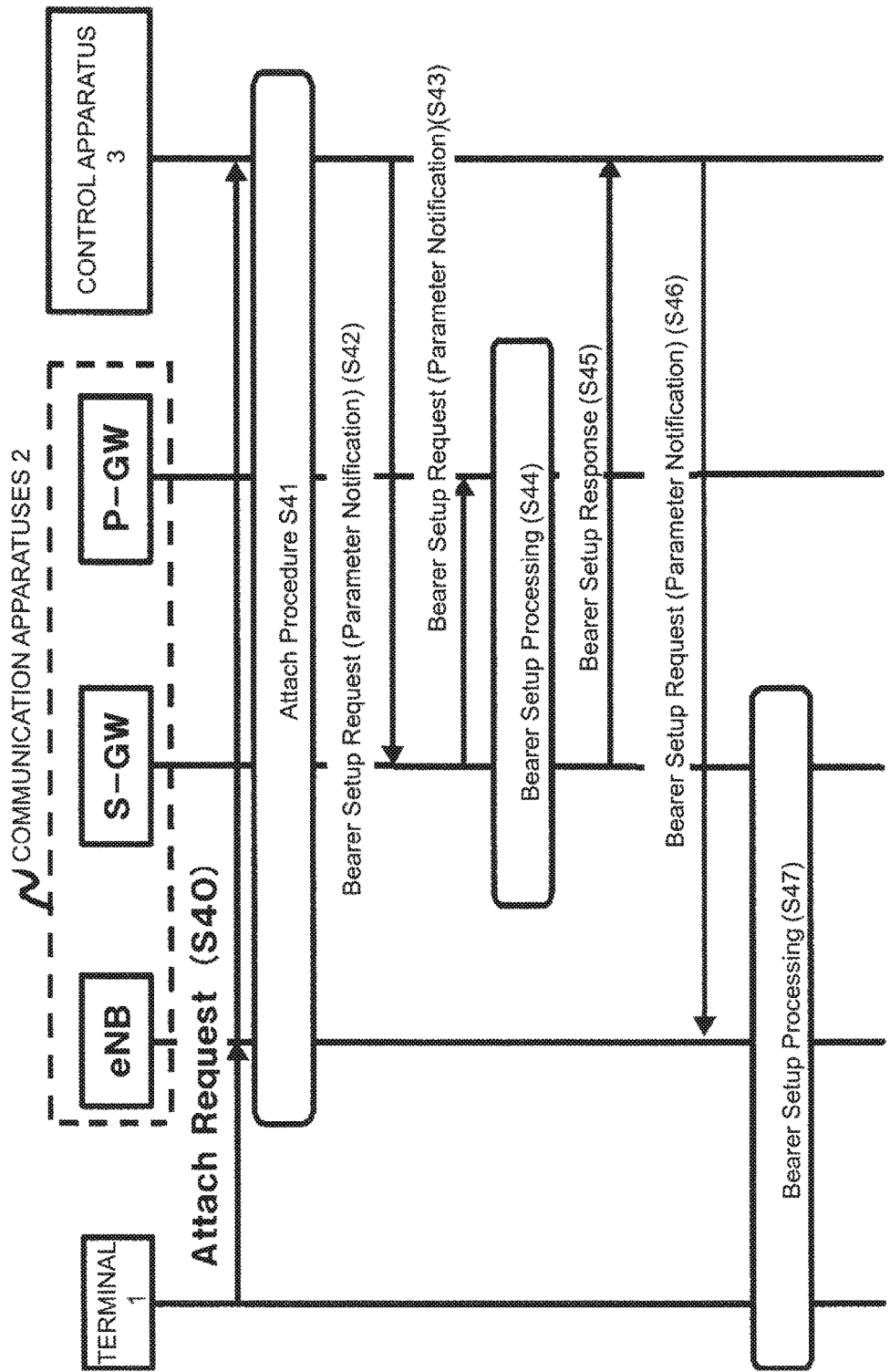
FIG. 10 is a sequence diagram showing an example of operations in the communication system according to the second exemplary embodiment.

FIG. 10 shows an example of operations for the control apparatus 3 to set parameters for communication quality control in the communication apparatuses 2, in the second exemplary embodiment.

The terminal 1, when its power supply is turned on or the like, sends an attach request to the control apparatus 3 via a neighboring eNB (Operation S40).

Triggered by the attach request, an attach procedure including, for example, processing for authenticating the terminal 1 and the like is performed (Operation S41).

The control apparatus 3 sends a bearer setup request to an S-GW (Operation S42). For example, the control section 31 of the control apparatus 3 selects an S-GW and a P-GW to set up a bearer and sends a bearer setup request to the selected S-GW. The control section 31 of the control apparatus 3 notifies the S-GW of a parameter (e.g., "PARAMETER" illustrated in FIG. 3 or 4) for the communication apparatuses 2 to select QoS information by putting it in the bearer setup request.

The control section 24 of the control apparatus 2 (S-GW) sends a bearer setup request including the parameter for selecting QoS information to the P-GW (Operation S43).

The control section 24 of the communication apparatus 2 (S-GW) and the control section 24 of the communication apparatus 2 (P-GW) each perform processing for bearer setup between the S-GW and the P-GW (Operation S44).

The control section 24 of the communication apparatus 2 (S-GW) sends a bearer setup response to the control apparatus 3 (Operation S45). This bearer setup response includes information to be notified to the eNB (including the parameter for selecting QoS information).

The control section 31 of the control apparatus 3 sends a bearer setup request, along with the information notified from the S-GW, to the eNB (Operation S46). This bearer setup request includes the parameter for the eNB to select QoS information.

The control section 24 of the control apparatus 2 (eNB), based on the information notified from the control apparatus 3, sets up the bearer with the terminal 1 and the bearer between the S-GW and the eNB (Operation S47).

3. Third Exemplary Embodiment

A third exemplary embodiment of the present invention will be described. The third exemplary embodiment can be applied to any of the techniques disclosed in the above-described first and second exemplary embodiments.

According to the third exemplary embodiment, communication apparatuses perform communication quality control based on a QCI and a parameter related to the user property of a terminal 1. A user property is a parameter related to a user's privilege (e.g., information indicating whether or not a user is a premium user). For example, a premium user is a user who has made a contract with a network operator to pay a higher fee than general users, and is a subscriber with a greater privilege (a "privileged-subscriber") than general users in terms of communication quality. Moreover, for example, a premium user may be a user who is granted a privilege (e.g., a VIP (Very Important Person) or the like) regardless of a contract with a network operator.

The communication apparatuses 2 perform communication quality control based on a user property, whereby the QoE (Quality of Experience) of the user of a terminal 1 is enhanced.

3.1) System

The communication apparatus 2 can select a DSCP value to be added to a packet, based on a QoS information DB 21 illustrated in FIG. 11 or 12. The communication apparatus 2 can use a user property for a parameter, as illustrated in FIGS. 11 and 12. In the third exemplary embodiment, a user property is any one of "premium user" and "general user", but the present invention is not limited to this example. For example, user properties may include a property other than "premium user" and "general user". Moreover, a user property may be a parameter indicating a charging contract (usage-based charging, prepaid charging, or the like) between a user and the operator.

Figure 13:
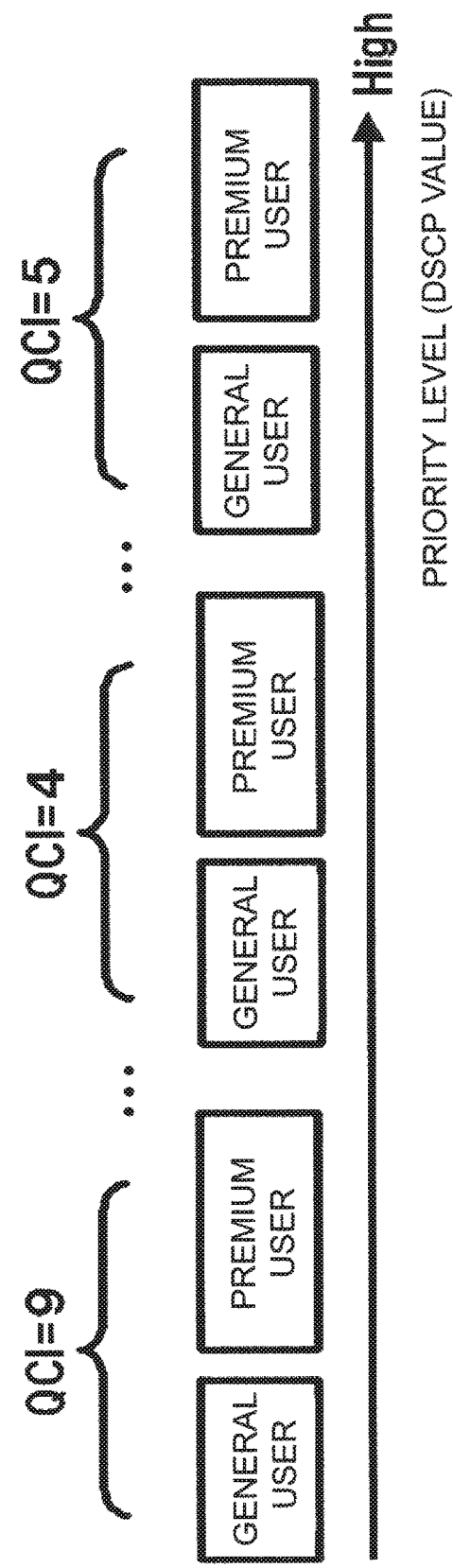
FIG. 13 is a schematic diagram showing a first example of communication quality control operation in the third exemplary embodiment.
Figure 14:
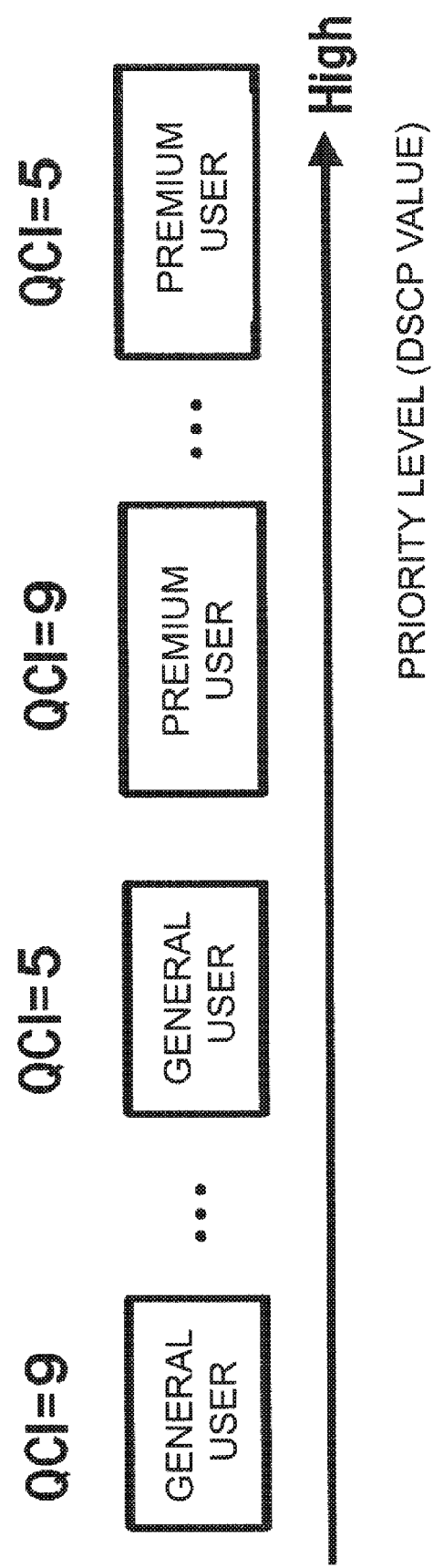
FIG. 14 is a schematic diagram showing a second example of the communication quality control operation in the third exemplary embodiment.

The communication apparatus 2 can perform communication quality control based on a QCI in preference to a user property by using the QoS information DB 21 shown in FIG. 11, as illustrated in FIG. 13. Moreover, the communication apparatus 2 can perform communication quality control based on a user property in preference to a QCI by using the QoS information DB 21 shown in FIG. 12, as illustrated in FIG. 14.

Figure 15:
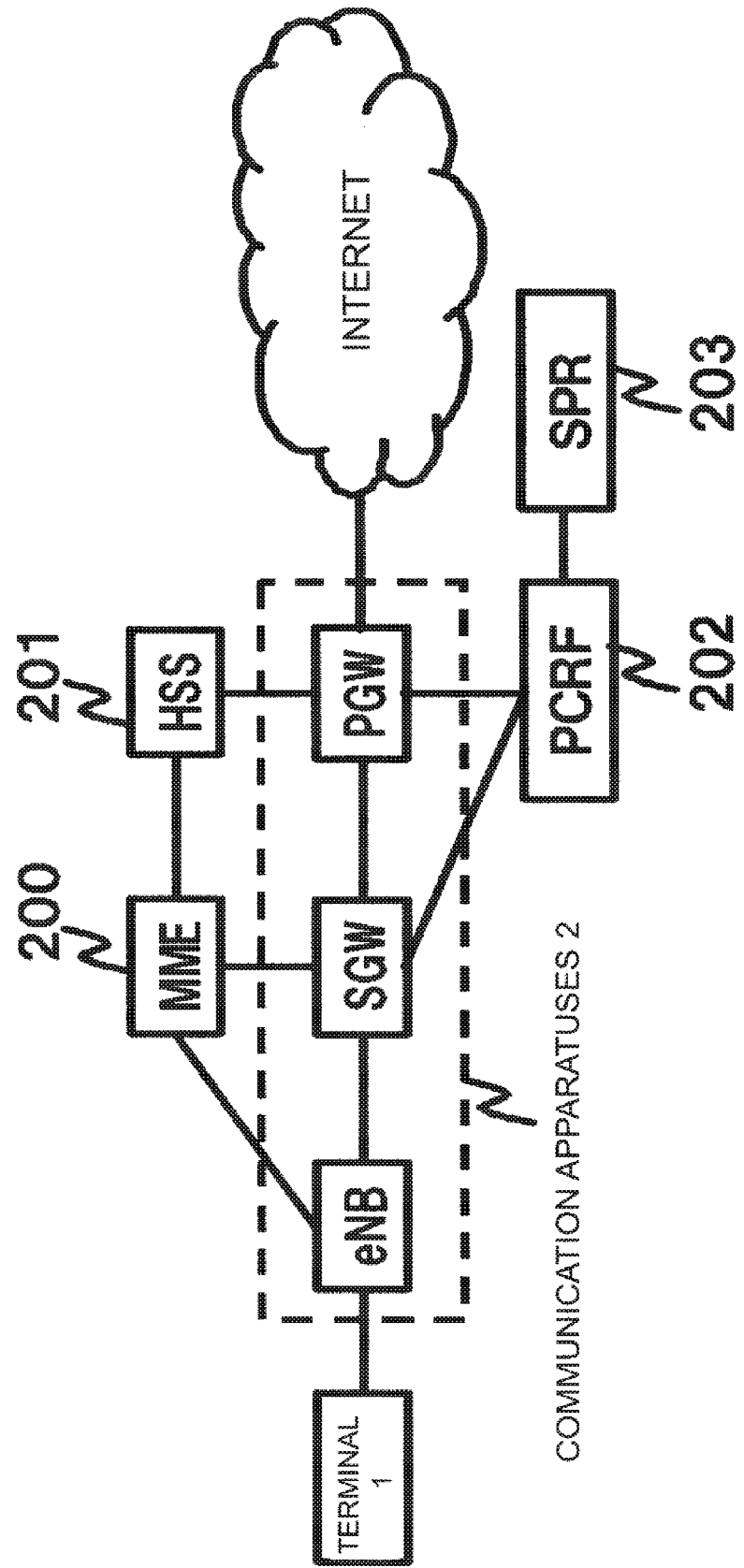
FIG. 15 is a diagram showing an example of the architecture of a communication system according to the third exemplary embodiment.

FIG. 15 is an example of the architecture of a system according to the third exemplary embodiment and here shows the architecture of a LTE (Long Term Evolution) system. However, the present exemplary embodiment is not limited to LTE but can be applied to other communications systems such as, for example, UMTS (Universal Mobile Telecommunication system) and WiMAX (Worldwide Interoperability for Microwave Access).

The system according to the third exemplary embodiment is assumed to include an eNB (eNodeB), an S-GW (Serving Gateway), and a P-GW (PDN (Packet Data Network) Gateway) as communication apparatuses 2 and further includes a MME (Mobility Management Entity) 200, a HSS (Home Subscriber Server) 201, a PCRF 202, and a SPR (Subscriber Profile Repository) 203.

The eNB is a base station wirelessly communicating with the terminal 1.

The S-GW has a function of routing and forwarding a data packet, a function serving as an anchor when the terminal 1 is handed over between eNBs, and the like.

The P-GW serves as an interface with an external network (PDN). A plurality of P-GWs (not shown in FIG. 15) are deployed in the system, and it is also possible that the terminal 1 concurrently connects to a plurality of P-GWs and accesses a plurality of PDNs.

The MME 200 is a control node in the LTE system and has a function of performing processing related to paging of the terminal 1. Moreover, the MME 200 has a function related to activation/deactivation of a bearer and can select an S-GW for the terminal 1 to access when the terminal 1 initially attaches to the system, when the terminal 1 is handed over, or the like. Moreover, the MME 200 has a function of performing user authentication in coordination with the HSS 201.

The HSS 201 is a node managing subscriber information. For example, the HSS 201 can manage the user property of each user as subscriber information.

The PCRF 202 is a node performing QoS control for data forwarding and control for charging.

The SPR 203 is a node managing information concerning the subscribers of the communication system.

3.2) Communication Apparatus

Figure 16:
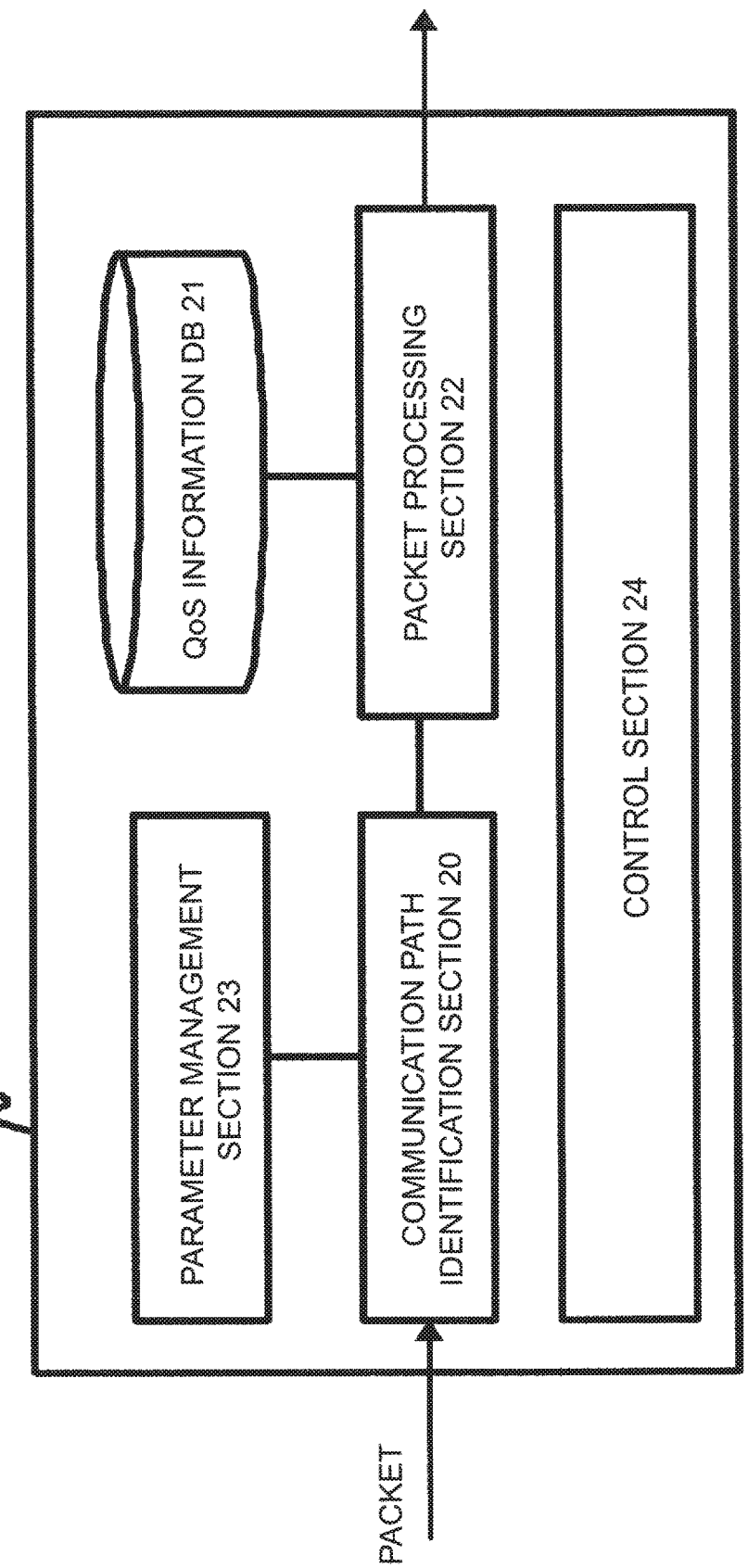
FIG. 16 is a block diagram showing an example of the configuration of a communication apparatus according to the third exemplary embodiment.

FIG. 16 shows an example of the configuration of a communication apparatus 2. Note that the communication apparatus 2 also includes functions that are not shown in FIG. 16. For example, the communication apparatus 2, if it is an eNB, includes the functions an eNB should be equipped with and, if it is an S-GW or a P-GW, includes the respective functions an S-GW or a P-GW should be equipped with.

The communication apparatus 2 includes a parameter management section 23, in addition to the functions included in the communication apparatus 2 illustrated in FIG. 2.

The parameter management section 23 manages a correspondence between bearers and user properties. For example, the parameter management section 23 acquires user properties managed by the HSS 201 from the MME 200 or another apparatus and manages the acquired user property by associating it with the identification information of a bearer (e.g., RB (Radio Bearer)-ID, TEID (Tunnel Endpoint ID), or the like) corresponding to each user. Moreover, the parameter management section 23 may manage the user property by associating it with the identification information of a bearer and the QCI of this bearer.

The communication path identification section 20 identifies a bearer to which a received packet belongs. For example, the communication path identification section 20 identifies a communication path to which a received packet belongs by referring to information (e.g., Layer 3/Layer 4 information in the OSI reference model, such as IP addresses and a port number) included in the packet. For example, based on information about the identified bearer (e.g., the identification information of the bearer and a QCI corresponding to the bearer), the communication path identification section 20 retrieves a user property associated with the bearer from the parameter management section 23 and notifies the retrieved user property to the packet processing section 22.

For example, based on the QCI of the bearer identified by the packet identification section 20 and the notified user property, the packet processing section 22 retrieves QoS information (a DSCP value) associated with the bearer from the QoS information DB 21. The packet processing section 22 adds the retrieved QoS information to the packet and forwards the packet. If the QoS information DB 21 is configured as illustrated in FIG. 11, the packet processing section 22 adds a DSCP value of "48", as QoS information associated with the bearer of QCI "5" and of user property "premium user", to the packet.

3.3) User Property Acquisition Operation (First Example)

Figure 17:
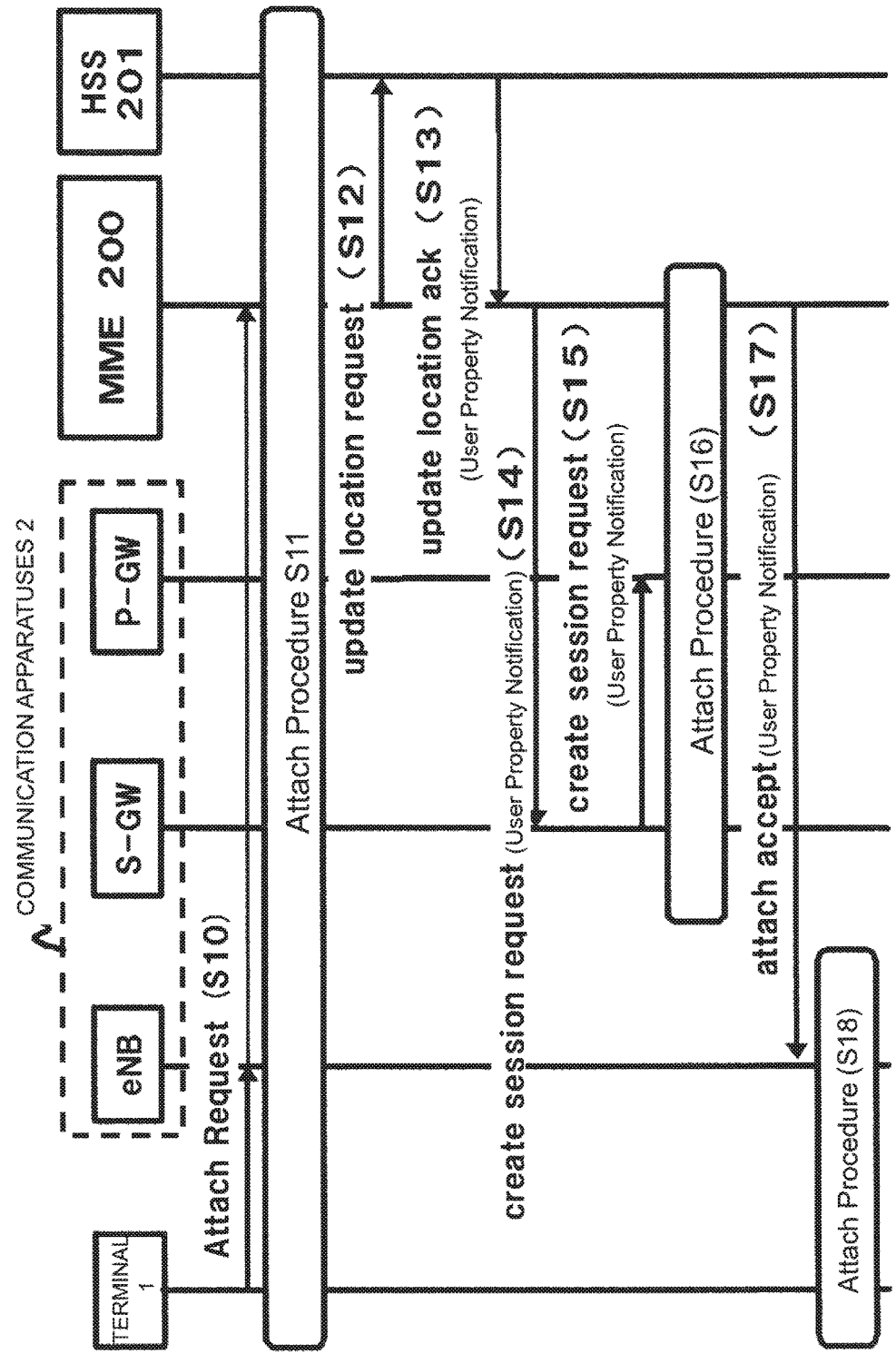
FIG. 17 is a sequence diagram showing a first example of user property acquisition operation in the communication system according to the third exemplary embodiment.

FIG. 17 shows an example of operations for the communication apparatuses 2 to acquire a user property associated with a bearer. Note that in the example of FIG. 17, the functions of the MME 200 are executed by the control section 31 of the control apparatus 3. Moreover, the respective functions of the P-GW, S-GW, and eNB are executed by the control sections 24 of the corresponding communication apparatuses 2, respectively.

When the MME 200 receives an attach request from the terminal 1 via the eNB (Operation S10), an attach procedure is performed in the system (Operation S11). The attach procedure in Operation S11 is, for example, a procedure described in 3GPP (3rd Generation Partnership Project) specifications (TS23.401 v12.1.0), and a detailed description thereof will be omitted. In the attach procedure in Operation S11, processing for authenticating the terminal 1 by the MME 200 and HSS 201, and the like are performed.

In Operation S12, the MME 200 sends an "update location request" message to the HSS 201. For example, in case where the MME 200 has no effective subscriber information (Subscription Data) on the terminal 1, the MME 200 sends an "update location request" to the HSS 201 if IMSI (International Mobile Subscriber Identity) is provided by the terminal 1, or the like.

The HSS 201, in response to the request from the MME 200, returns an "update location ack" message (Operation S13). The "update location ack" message includes subscriber information (Subscription Data). In the third exemplary embodiment, for example, the HSS 201 puts a user property (e.g., information indicating "premium user" or "general user") in the subscriber information (Subscription Data).

Moreover, the HSS 201 can put information "EPS Subscription QoS Profile" in the subscriber information. In the third exemplary embodiment, it is also possible to put a user property in this "EPS Subscription QoS Profile".

The MME 200 sends a "create session request" message for requesting bearer setup to a selected S-GW (Operation S14). At that time, the MME 200 assigns an EPS bearer ID corresponding to a bearer associated with the terminal 1 for the selected S-GW and notifies the S-GW of the bearer ID assigned for the S-GW and information related to QoS (a QCI or the like) corresponding to this bearer by using the "create session request" message. In the third exemplary embodiment, information related to the user property is included in the "create session request", in which, for example, the bearer ID and the user property are associated with each other, and sent to the S-GW.

The S-GW, when receiving the "create session request" message from the MME 200, stores the information related to bearer (e.g., the bearer ID) and user property notified from the MME 200 in the parameter management section 23, with the information and the user property being associated with each other. For example, the S-GW creates a new entry defining a correspondence between the bearer ID and the user property in an "EPS Bearer Table" managed by the parameter management section 23. The S-GW notifies the P-GW of the bearer ID, information related to QoS (a QCI or the like) corresponding to this bearer, and the like by using a "create session request" message (Operation S15). In the third exemplary embodiment, the S-GW can put information related to the user property in the "create session request" and send it to the P-GW. For example, the S-GW notifies the P-GW of the bearer ID and the user property which are associated with each other. For example, the P-GW stores a correspondence between the bearer ID and the user property in the parameter management section 23, based on the information notified from the S-GW.

After the above-described procedure, the attach procedure is performed by the P-GW and others (Operation S16). Details of the attach procedure are similar to the procedure disclosed in TS23.401 v12.1.0, and therefore a detailed description thereof will be omitted. For example, the S-GW performs processing for setting up a bearer with the P-GW. For example, the P-GW performs processing for connecting to a PDN in coordination with the PCRF. Through these procedures, the setup of the bearer between the S-GW and the P-GW is completed. Upon completion of the bearer setup, the S-GW notifies the MME 200 of information to be conveyed to the eNB.

Subsequently, the MME 200 sends an "Attach Accept" message to the eNB (Operation S17). For example, the MME 200 notifies the eNB of the bearer ID, information related to QoS (a QCI or the like) corresponding to this bearer, and the like. In the third exemplary embodiment, the MME 200 can put information related to the user property in the "Attach Accept" message and send it to the eNB. For example, the MME 200 notifies the eNB of the bearer ID and the user property which are associated with each other. For example, the eNB stores a correspondence between the bearer ID and the user property in the parameter management section 23, based on the information notified from the MME 200.

After the above-described procedure, the rest of the attach procedure is performed, whereby the bearer from the terminal 1 to the P-GW is constructed (Operation S18).

In the above-described example of FIG. 17, the MME 200 having the functions of the control apparatus 3 configures the QoS information DBs 21 of the communication apparatuses 2. For example, the QoS information DBs 21 are configured in the communication apparatuses 2 before the above-described sequence in FIG. 17 is performed.

The above-described sequence illustrated in FIG. 17 shows a procedure in which, triggered by the terminal 1's attaching to a network, a default bearer is set up. After this default bearer is set up, a dedicated bearer is set up in some cases to transmit, for example, traffic related to a predetermined communication service. The dedicated bearer is established, whereby a plurality of bearers are established with respect to the terminal 1.

3.4) User Property Acquisition Operation (Second Example)

Figure 18:
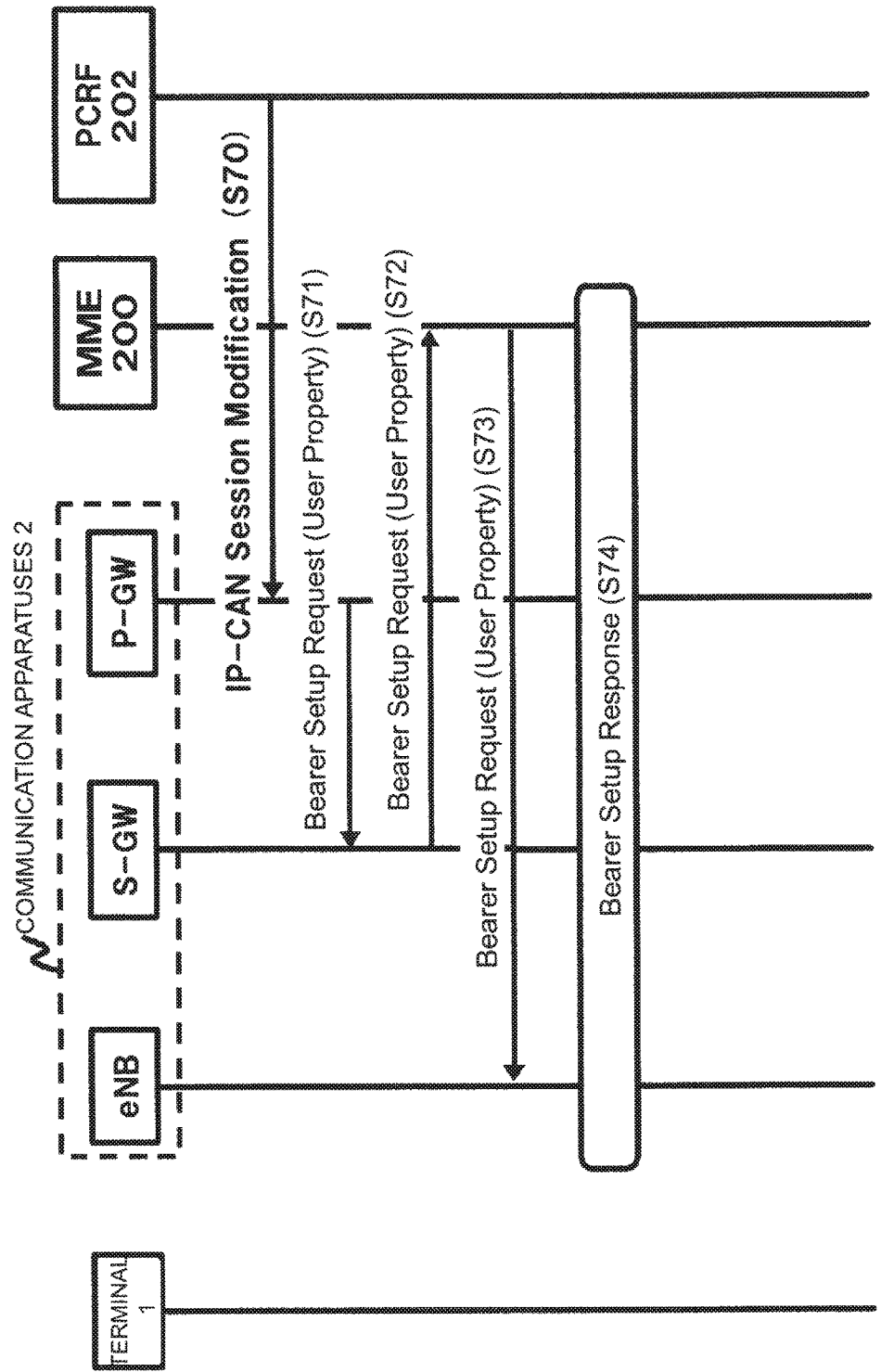
FIG. 18 is a sequence diagram showing a second example of the user property acquisition operation in the communication system according to the third exemplary embodiment.

FIG. 18 shows an example of a sequence for the communication apparatuses 2 to acquire a user property when a dedicated bearer is established. A dedicated bearer is performed, for example, after a default bearer is established through the procedure shown in FIG. 17. In the example of FIG. 18, the functions of the MME 200 are executed by the control section 31 of the control apparatus 3. Moreover, in the example of FIG. 18, the respective functions of the P-GW, S-GW, and eNB are executed by the control sections 24 of the corresponding communication apparatuses 2, respectively.

The P-GW, at an instruction ("IP-CAN Session Modification") from the PCRF 202 (Operation S70), notifies a bearer setup request to the S-GW in response to this instruction (Operation S71). The P-GW puts a user property, which is acquired through the default bearer establishment procedure, in the bearer setup request. For example, the bearer setup request, in which the identification information of the dedicated bearer (e.g., a TEID) and the user property are associated with each other, is notified to the S-GW.

The S-GW stores the user property notified from the P-GW in the parameter management section 23 and notifies the user property to the MME 200 by putting it in a bearer setup request (Operation S72). For example, the bearer setup request, in which the bearer identification information (e.g., a TEID) and the user property are associated with each other, is notified to the MME 200.

The MME 200 notifies the user property notified from the S-GW to the eNB by putting it in a bearer setup request (Operation S73). For example, the bearer setup request, in which the bearer identification information (e.g., a TEID) and the user property are associated with each other, is notified to the eNB. The eNB stores the user property notified from the MME 200 in the parameter management section 23

Subsequently, the eNB, S-GW, P-GW, and MME 200 exchange control signals related to bearer setup responses (Operation S74).

Through the above-described sequence, the communication apparatuses 2 acquire the user property.

3.5) User Property Acquisition Operation (Third Example)

Figure 19:
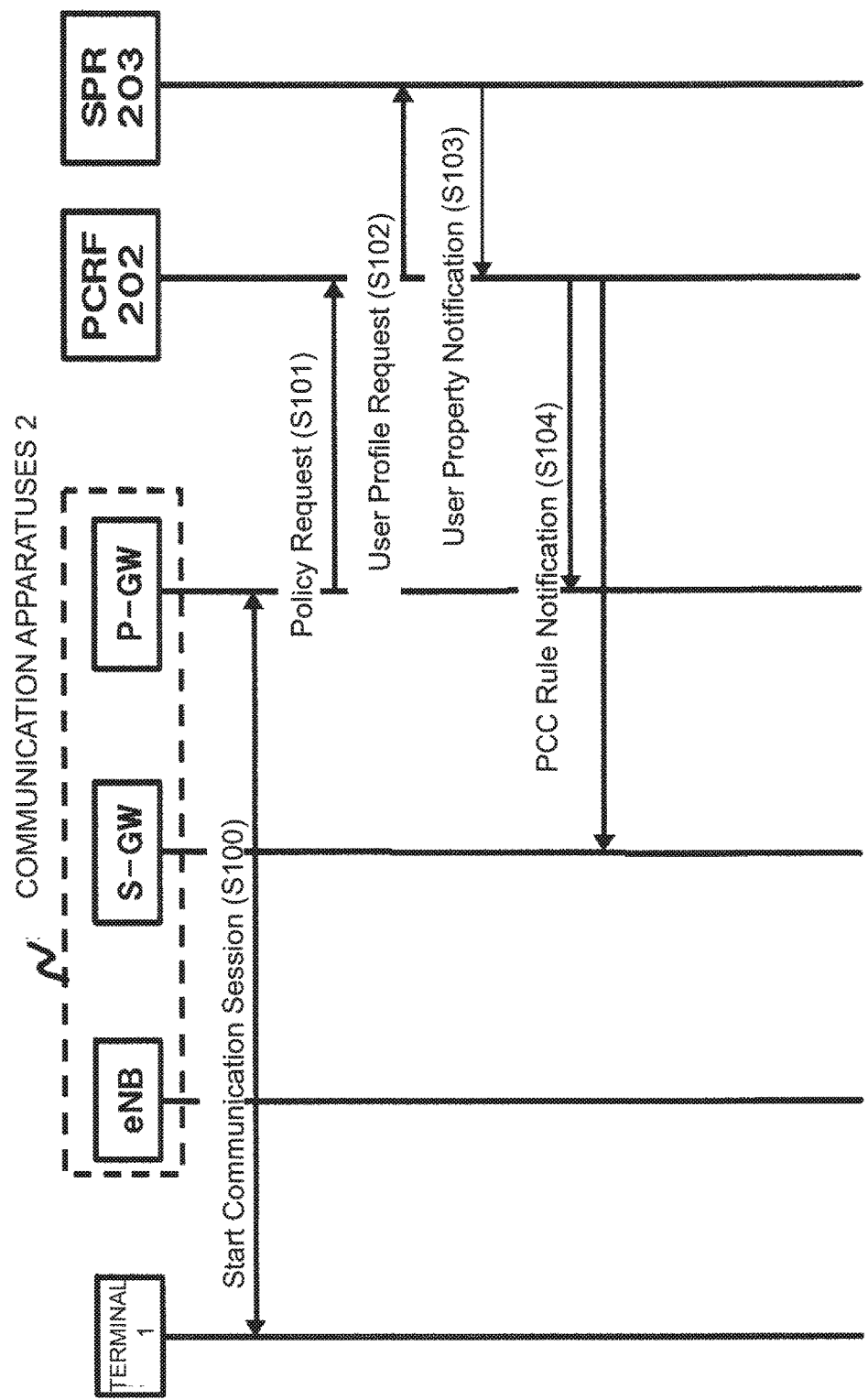
FIG. 19 is a sequence diagram showing a third example of the user property acquisition operation in the communication system according to the third exemplary embodiment.

FIG. 19 shows another example of operations for the communication apparatuses 2 to acquire a user property. Note that in the example of FIG. 19, the PCRF 202 has the functions of the control apparatus 3 shown in FIG. 9.

The terminal 1 starts a communication through an IP session (a bearer) (Operation S100).

When the communication session is started, the P-GW requests an applicable policy from the PCRF, based on the identification information of the terminal 1 (e.g., an IP address or the like) (Operation S101).

The PCRF 202 requests a user profile related to the terminal 1 from the SPR 203 (Operation S102).

The SPR 203, in response to the request from the PCRF 202, notifies user property information related to the user of the terminal 1 to the PCRF 202 (Operation S103). The PCRF 202 refers to the user property information notified from the SPR 203 and determines a QoS policy to be applied to the P-GW and the S-GW.

The PCRF 202 notifies the determined QoS policy as a PCC (Policy Control and Charging) rule to the P-GW and the S-GW (Operation S104). The PCC rule is, for example, a rule indicating to add QoS information to a packet based on the QCI of the bearer to which the terminal 1 belongs and the user property.

The P-GW and the S-GW perform communication quality control based on the QCI and the user property as described above in accordance with the PCC rule.

With the above-described examples (e.g., the sequence illustrated in FIG. 17, 18 or 19), it is possible that each communication apparatus 2 acquires a user property and performs communication quality control in consideration of the user property.

Moreover, for example, the control apparatus 3 that has functionality as a NMS managing the communication apparatuses 2 and the like may notify a user property to the communication apparatuses 2. That is, it is also possible that the communication apparatuses 2 acquire a user property from an apparatus other than those conforming to the specifications standardized by 3GPP and the like.

4. Fourth Exemplary Embodiment

A fourth exemplary embodiment of the present invention will be described. The fourth exemplary embodiment can be applied to any of the techniques disclosed in the above-described first to third exemplary embodiments.

According to the fourth exemplary embodiment, communication apparatuses can perform communication quality control based on a parameter related to the communication property of a user as a user property. The communication property of a user is, for example, the amount of a user's communication during a predetermined period (e.g., on a daily, weekly or monthly basis, or the like). For example, the operator of a system defines the user property of a user whose communication amount during a predetermined period is larger than an expected average communication amount as "heavy user", and communication quality control can be performed based on whether or not a user is a "heavy user".

The communication apparatuses according to the fourth exemplary embodiment perform communication quality control based on a QCI and a user property related to the communication property of the user of a terminal 1. For example, when both a heavy user and a general user make a flat-rate contract with an operator, the fees paid to the operator by the heavy user and the general user are approximately the same. Although their communication fees are approximately the same, it is conceivable that the general user's QoE will be degraded because the heavy user presses the communication bandwidth of the system. Accordingly, the communication apparatuses 2 perform communication quality control based on the communication property of a user, whereby it is possible to ensure fairness between users.

4.1) System

Each communication apparatus according to the fourth exemplary embodiment has a configuration basically similar to the communication apparatus 2 shown in FIG. 16, but information stored in the QoS information DB 21 is different. Hereinafter, a QoS information DB 21 illustrated in FIG. 20 will be described.

FIG. 20 shows an example of the configuration of the QoS information DB 21/QoS policy DB 32 used in the fourth exemplary embodiment. In the example of FIG. 20, a parameter indicating "general user" or "heavy user" is used for a parameter related to the user property.

Figure 21:
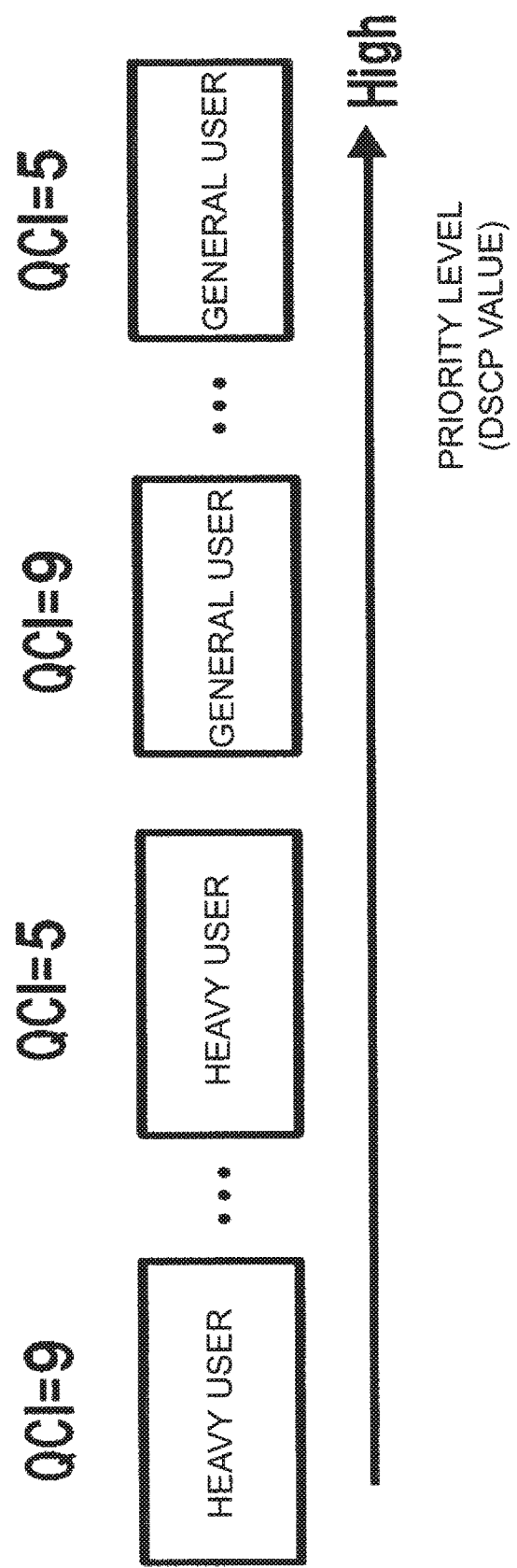
FIG. 21 is a schematic diagram showing an example of communication quality control operation in the fourth exemplary embodiment.

In the example of FIG. 20, for example, even if bearers have the same QCI, QoS information (e.g., DSCP values) can be different depending on the communication properties of users (e.g., "general user" or "heavy user") associated with these bearers. QoS information in the QoS information DB 21 or QoS policy DB 32 illustrated in FIG. 20 is set such that the priority level of a "heavy user" will be lower than that of a "general user", as schematically shown in FIG. 21.

Figure 22:
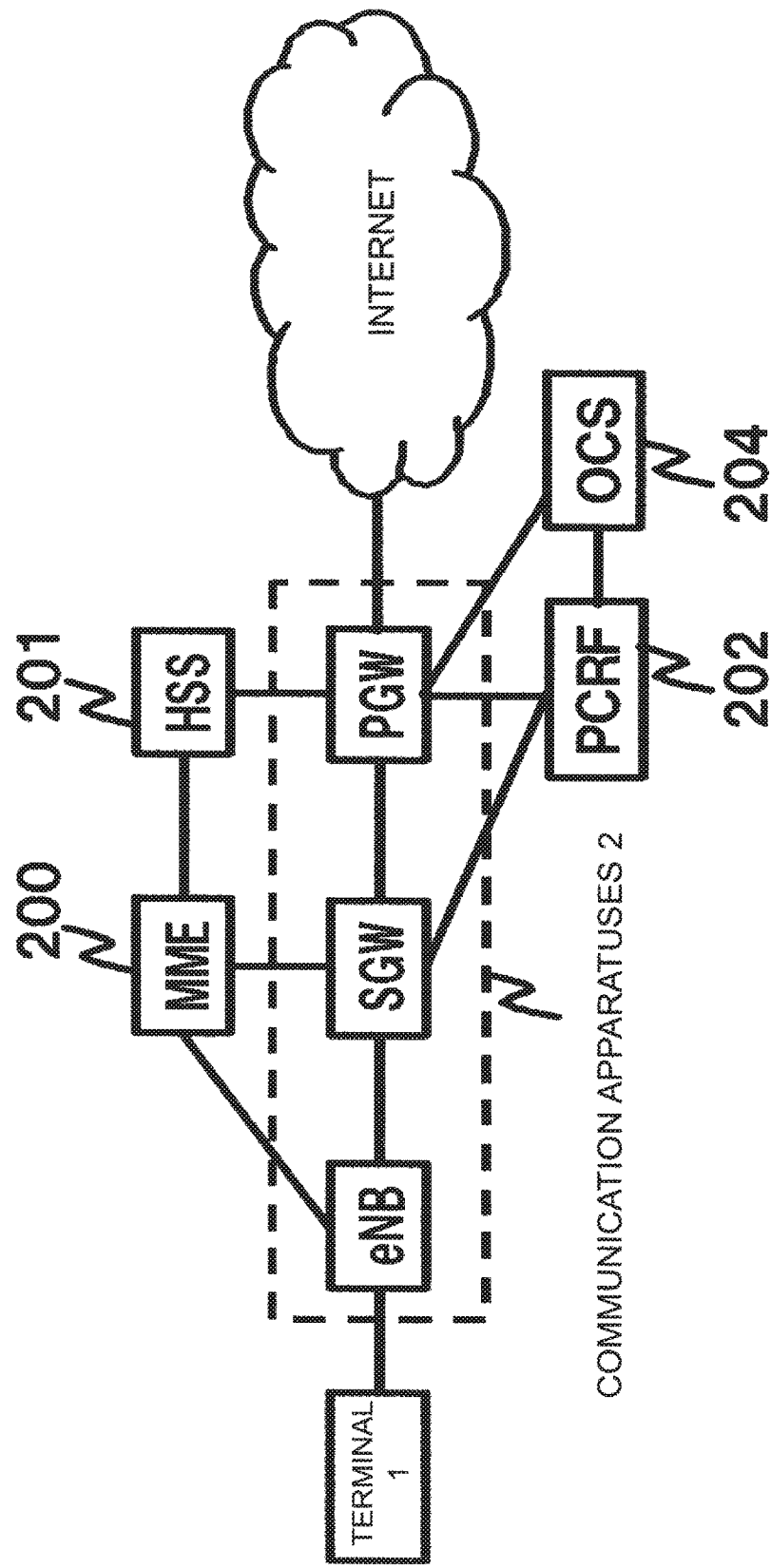
FIG. 22 is a diagram showing an example of the architecture of a communication system according to the fourth exemplary embodiment.

FIG. 22 shows an example of the architecture of a system according to the fourth exemplary embodiment. The system according to the fourth exemplary embodiment includes an OCS (Online Charging System) 204, in addition to the system architecture shown in the third exemplary embodiment.

The OCS 204 has a function that allows the operator of the system to perform processing for online charging based on the amount of a user's communication. The OCS 204 has a function of monitoring the amount of a user's communication, for example, via a P-GW or the like having the functionality of PCEF (Policy and Charging Enforcement Function). In the fourth exemplary embodiment, the communication characteristic of a user can be determined by using the communication amount monitoring function of the OCS 204.

4.2) Operations

Figure 23:
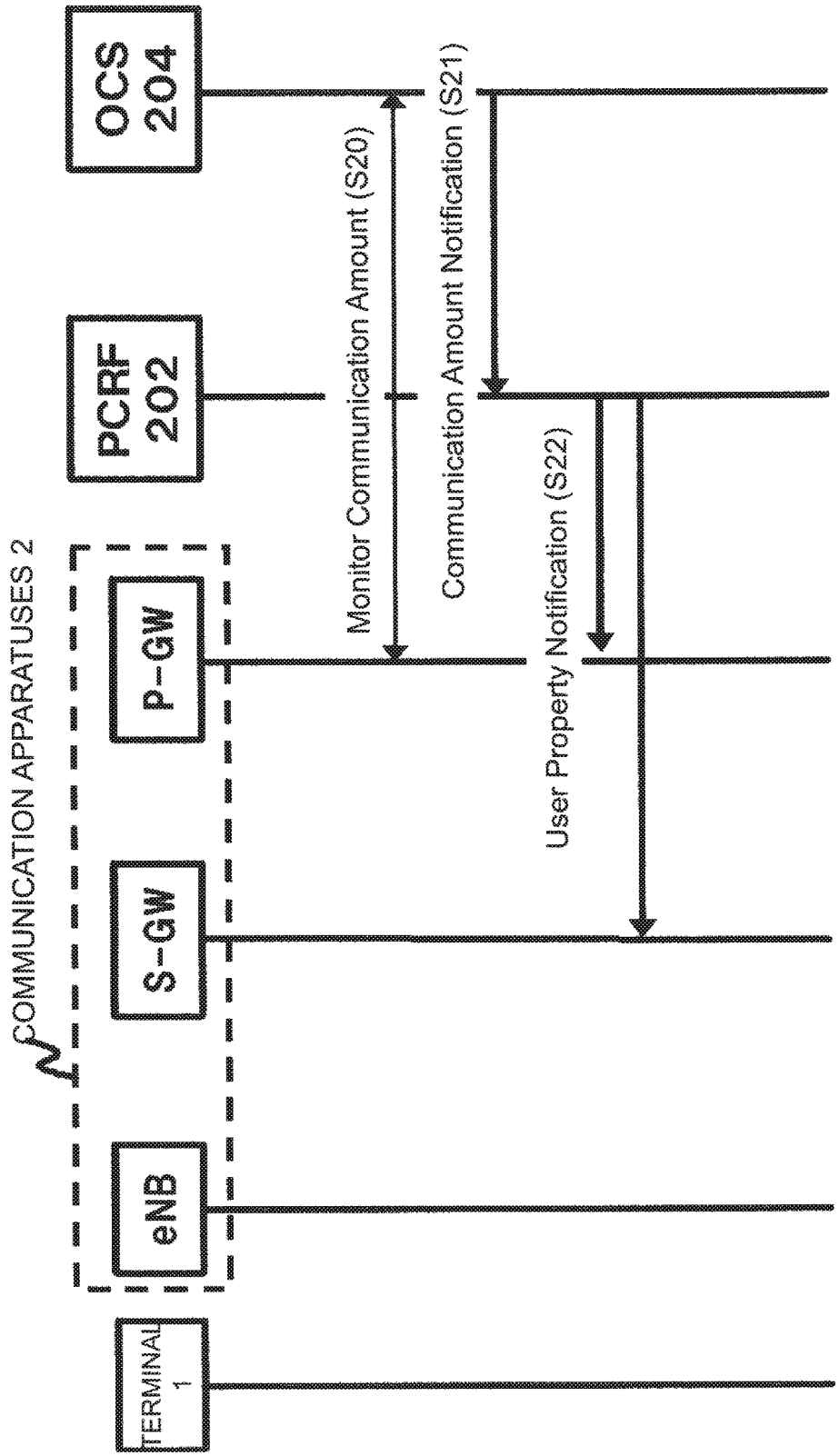
FIG. 23 is a sequence diagram showing an example of operations in the communication system according to the fourth exemplary embodiment.

FIG. 23 shows an example of operations in the fourth exemplary embodiment. Note that in the example of FIG. 23, the PCRF 202 has the functions of the control apparatus 3.

For example, the OCS 204 monitors the amount of communication of the terminal 1 via a P-GW having the functionality of PCRF (Operation S20). The OCS 204 may notify the PCRF 202 that the amount of communication of the terminal 1 exceeds a predetermined threshold within a predetermined period when such an event occurs, or the OCS 204 may periodically notify the amount of communication of the terminal 1 to the PCRF 202 (Operation S21). In case where the amount of communication of the terminal 1 is periodically notified from the OCS 204, the PCRF 202 calculates the amount of communication of the terminal 1 within the predetermined period and determines whether or not that communication amount exceeds the predetermined threshold.

If the amount of communication of the terminal 1 exceeds the predetermined threshold, the PCRF 202 notifies the communication apparatuses 2 (S-GW and P-GW) that the user property of this terminal 1 is "heavy user" (Operation S22).

Each communication apparatus 2 stores a correspondence between the bearer ID and the user property in the parameter management section 23, based on the information notified from the PCRF 202. Moreover, the information illustrated in FIG. 20 has been set in the QoS information DB 21 of each communication apparatus 2. Accordingly, the communication apparatus 2 can perform communication quality control in accordance with the control of the PDRF 202, which has the functions of the control apparatus 3, based on the parameter management section 23 and the QoS information DB 21.

5. Fifth Exemplary Embodiment

A fifth exemplary embodiment of the present invention will be described. The fifth exemplary embodiment can be applied to any of the techniques disclosed in the above-described first to fourth exemplary embodiments.

Communication apparatuses according to the fifth exemplary embodiment can perform communication quality control based on a parameter related to the state of a communication system. The fifth exemplary embodiment enables the operator of a system to perform communication quality control in units larger than units of user traffic.

5.1) System

Figure 24:
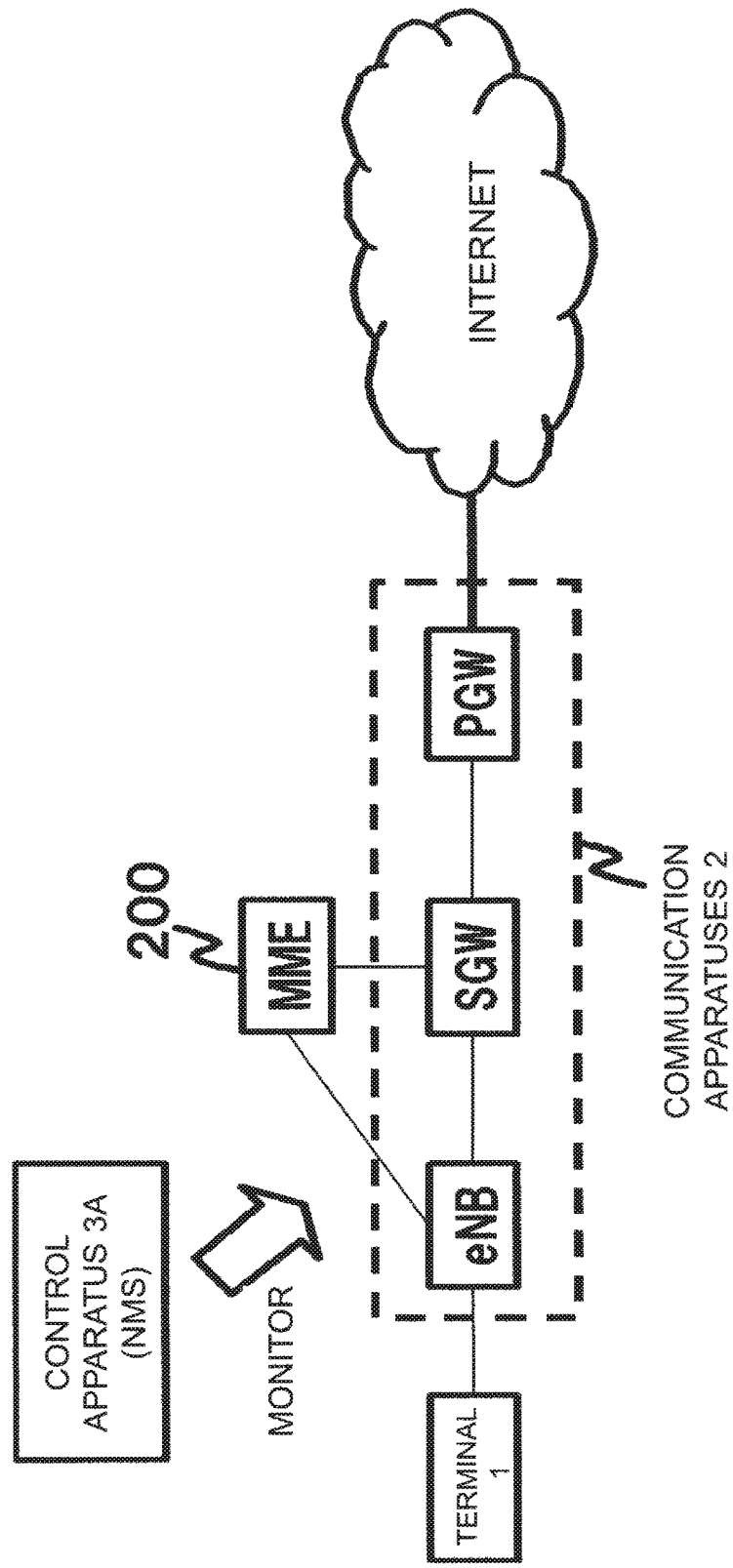
FIG. 24 is a diagram showing an example of the architecture of a communication system according to a fifth exemplary embodiment of the present invention.

FIG. 24 shows an example of the architecture of a system according to the fifth exemplary embodiment. The communication system according to the fifth exemplary embodiment includes a control apparatus 3A that has the functionality of NMS. The control apparatus 3A has a function of monitoring the state of the communication system (e.g., the state of congestion in the system). The other part of the architecture is similar to those of the above-described exemplary embodiments, and therefore a detailed description thereof will be omitted.

Figure 25:
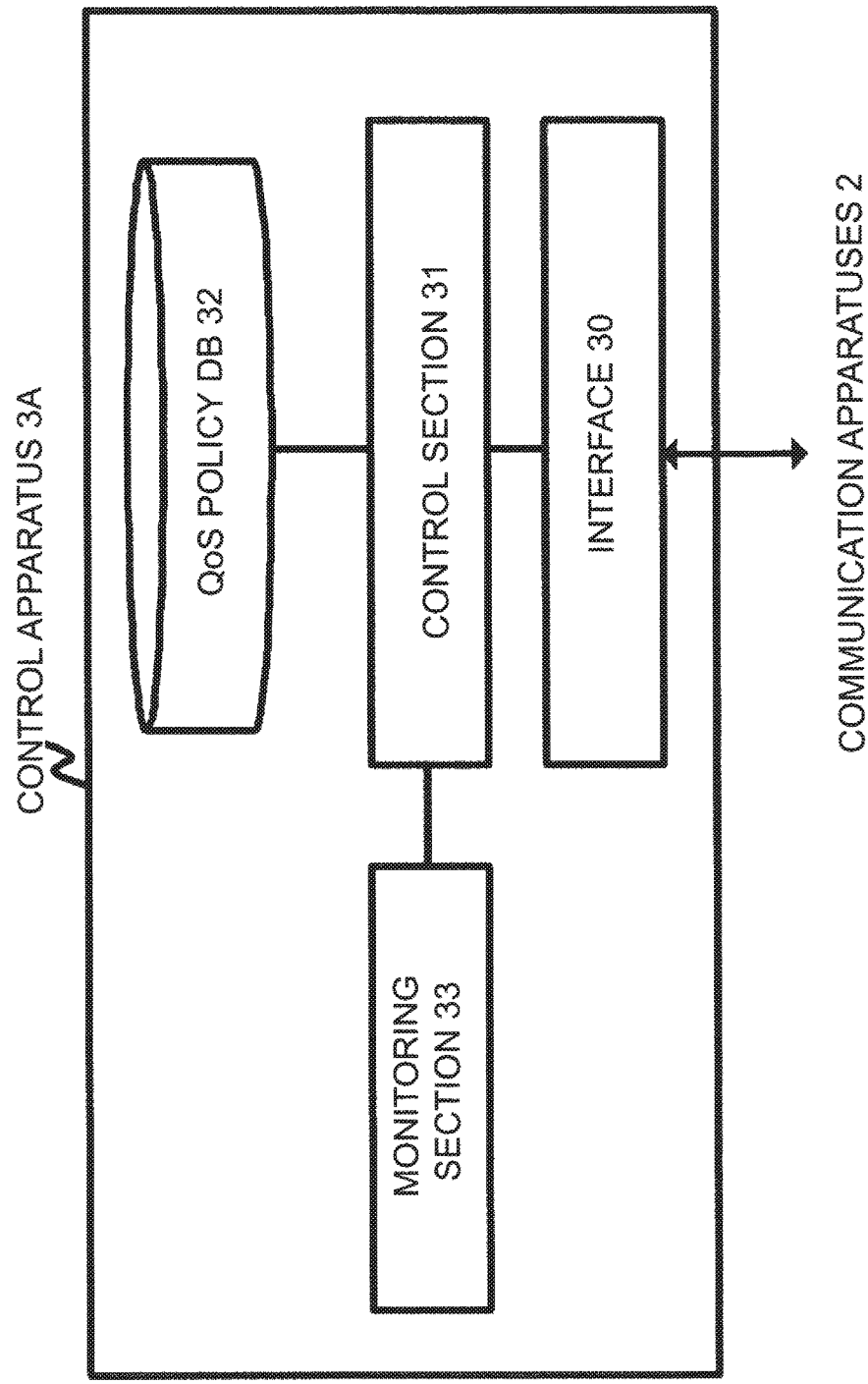
FIG. 25 is a block diagram showing an example of the configuration of a control apparatus according to the fifth exemplary embodiment.

FIG. 25 shows an example of the configuration of the control apparatus 3A. The control apparatus 3A includes a monitoring section 33, in addition to the functions shown in FIG. 9. The other functions and configuration are similar to those of the above-described exemplary embodiments, and therefore a detailed description thereof will be omitted. The monitoring section 33 monitors the communication state of the system, for example, the state of congestion and the like in the mobile backhaul and the core network. The monitoring section 33 notifies a monitoring result to the communication apparatuses 2 via the interface 30. For example, a congestion level of the system is notified as such a monitoring result. It is also possible that the monitoring section 33 identifies a time period in a day during which congestion easily occurs, based on statistical values of the communication state (e.g., changes in communication amount over time), and notifies such a time period as a monitoring result.

Each communication apparatus 2 stores the information (the above-mentioned congestion level, time period during which congestion easily occurs, or the like) notified from the monitoring section 33 in the parameter management section 23. For example, the communication path identification section 20 of the communication apparatus 2 refers to a parameter stored in the parameter management section 23 and notifies this parameter, along with information related to an identified bearer, to the packet processing section 22. For example, the packet processing section 22 adds a DSCP value to a packet, based on the notified parameter and QCI. In case where a time period during which congestion easily occurs is used as a parameter related to a communication state, the communication path identification section 20 notifies the packet processing section 22 of a parameter indicating whether or not the current time falls within the time period notified from the control apparatus 3A. If the notified parameter indicates that it is the time period during which congestion easily occurs, the packet processing section 22 adds a DSCP value associated with this time period to a packet.

5.2) QoS Information/QoS Policy DB

FIG. 26 shows an example of the configuration of a QoS information DB 21/QoS policy DB 32 used in the fifth exemplary embodiment. In the example of FIG. 26, a congestion level of the system is used for a parameter related to the communication status of the system, and here a larger value of the congestion level indicates a higher degree of congestion.

In the QoS information DB 21/QoS policy DB 32 illustrated in FIG. 26, the priority levels of bearers are set such that even if bearers have the same QCI, a bearer at a higher congestion level will have lower priority, and such that the range of reduction in the DSCP value as the congestion level increases becomes greater as QCI has lower priority. For example, in case of QCI "5", the DSCP value is decremented by 1 as the congestion level increases. On the other hand, in case of QCI "6", which has lower priority than QCI "5", the range of reduction in the DSCP value as the congestion level increases is greater than that in case of QCI "5".

Although a congestion level is used for a parameter in the example of FIG. 26, it is also possible to use another parameter that indicates whether or not it is a time period during which congestion easily occurs. In this case, a DSCP value associated with the time period during which congestion easily occurs can be set at a lower priority level than DSCP values associated with other time periods in a day.

The communication apparatus 2 can perform communication quality control based on the information in the QoS information DB 21 illustrated in FIG. 26 and a congestion level notified from the control apparatus 3A. The communication apparatus 2 performs communication quality control in this manner, whereby the communication apparatus 2 can accommodate traffic of a higher-priority QCI with a communication bandwidth by sacrificing traffic of a lower-priority QCI even if the congestion level increases.

FIG. 27 shows another example of the configuration of the QoS information DB 21/QoS policy DB 32 used in the fifth exemplary embodiment.

In the example of FIG. 27, DSCP values based on a plurality of kinds of parameters (user property and congestion level) are set in the QoS information DB 21/QoS policy DB 32. The communication apparatuses according to the present exemplary embodiment can perform communication quality control based on a plurality of kinds of parameters, and the same applies to not only the present exemplary embodiment but also the above-described exemplary embodiments. For example, if a communication apparatus 2 performs communication quality control by using a congestion level and a user property, the parameter management section 23 stores bearer IDs and user properties corresponding to individual users which are associated with each other, and also stores information notified from the monitoring section 33 as communication statuses of the system (e.g., congestion levels, a time period during which congestion easily occurs, or the like). For example, the communication path identification section 20 of the communication apparatus 2 refers to the parameters stored in the parameter management section 23 and notifies a user property and a congestion level associated with an identified bearer to the packet processing section 22. For example, the packet processing section 22 adds a DSCP value to a packet, based on the notified parameters (a user property and a congestion level) and QCI.

In the example of FIG. 27, for example, the ranges of reduction in the DSCP value as the congestion level increases differ with user property. For example, the range of reduction in the DSCP value for "general user" is greater than those for "premium user".

The communication apparatus 2 can perform communication quality control based on the information in the QoS information DB 21 illustrated in FIG. 27 and a congestion level notified from the control apparatus 3A. The communication apparatus 2 performs communication quality control in this manner, whereby the communication apparatus 2 can maintain the communication quality of traffic for premium users, who have higher priority, as high as possible even if the congestion level increases.

5.3) Operations

Figure 28:
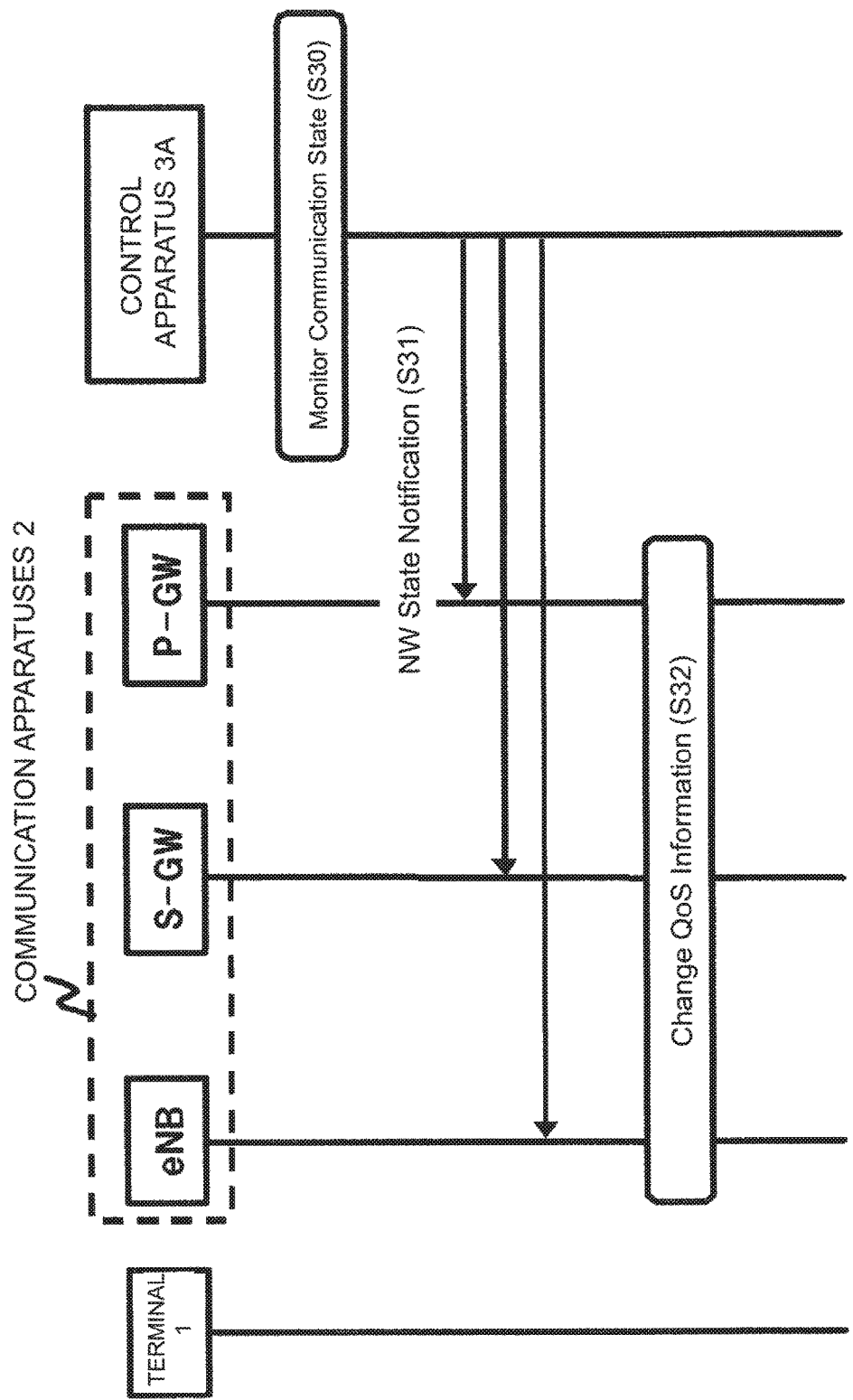
FIG. 28 is a sequence diagram showing an example of operations in the communication system according to the fifth exemplary embodiment.

FIG. 28 shows an example of operations in the communication system according to the fifth exemplary embodiment.

The control apparatus 3A, which has the functionality of NMS, monitors the communication state of the system (Operation S30).

The control apparatus 3A, based on a monitoring result, notifies a parameter related to communication status (e.g., a congestion level) to the communication apparatuses 2 such as a P-GW (Operation S31).

The communication apparatuses 2 performs communication quality control based on the parameter notified from the control apparatus 3A (Operation S32).

In the fifth exemplary embodiment, a parameter related to disasters such as earthquake may be used. In this case, in the QoS information DB 21/QoS policy DB 32, DSCP values are set depending on disaster levels that correspond to the degrees of severity of a disaster, as illustrated in FIGS. 29 and 30. For example, DSCP values are set such that the priority level becomes lower as the disaster level becomes higher (i.e., the degree of a disaster becomes severer). Moreover, for example, DSCP values are set such that the range of reduction in the DSCP value as the disaster level increases becomes greater as QCI has lower priority.

6. Sixth Exemplary Embodiment

A sixth exemplary embodiment of the present invention will be described. The sixth exemplary embodiment can be applied to any of the techniques disclosed in the above-described first to fifth exemplary embodiments.

According to the sixth exemplary embodiment, communication apparatuses can perform communication quality control based on the content of a contract between a user and a service provider (e.g., a video distribution provider). In other words, a communication carrier can provide new services based on the communication quality control according to the sixth exemplary embodiment. For example, a communication carrier can provide services based on the above-mentioned communication quality control to service providers. A carrier can provide such services to providers and charge service fees to the providers.

Figure 31:
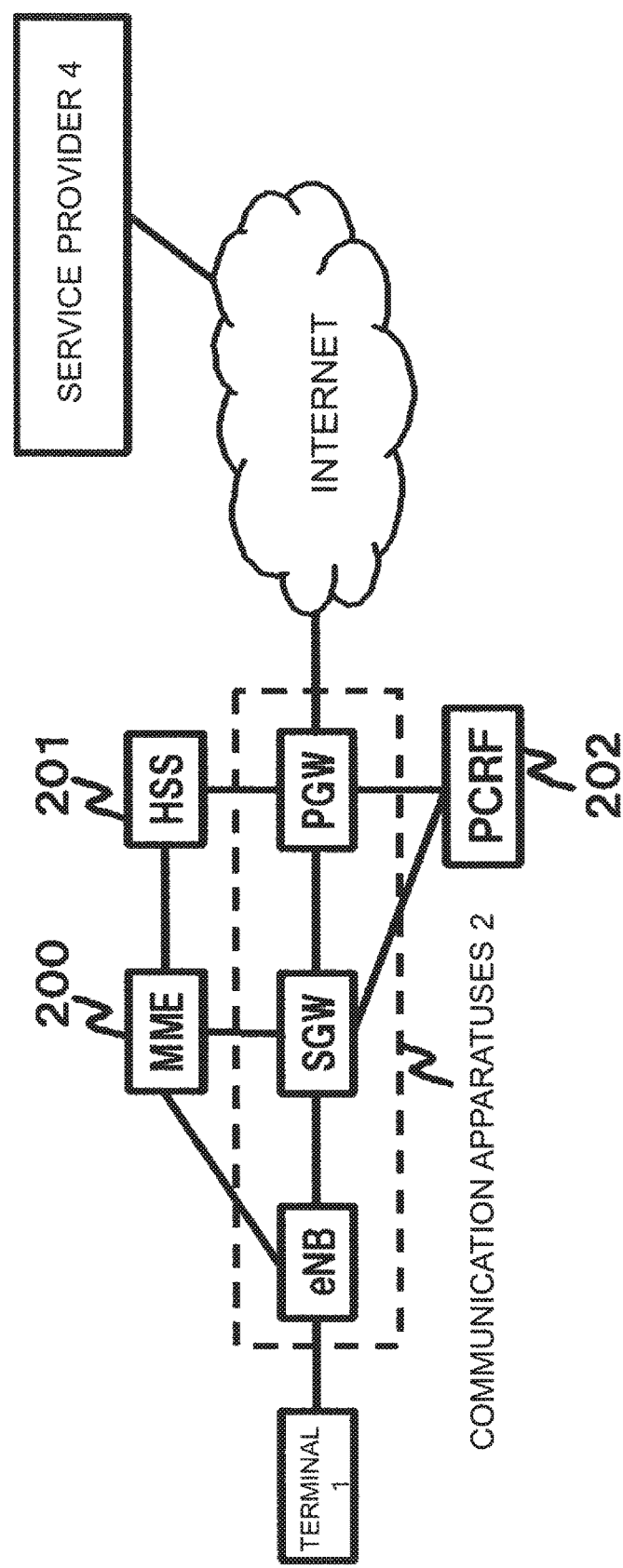
FIG. 31 is a diagram showing an example of the architecture of a communication system according to a sixth exemplary embodiment of the present invention.

FIG. 31 shows an example of the architecture of a communication system according to the sixth exemplary embodiment. It is assumed that the user of a terminal 1 has made a contract with a service provider 4 (e.g., a video distribution provider). The other part of the system architecture is similar to those of the above-described exemplary embodiments, and therefore a detailed description thereof will be omitted.

For example, the service provider 4 makes a service contract based on communication quality control with a communication carrier and provides the communication carrier with information related to contracts made with users. It is assumed that among the contracts between the service provider 4 and users are, for example, a "general contract" and a "premium contract", depending on the fees the users pay to the service provider 4. Note that the service provider 4 may make a contract with the communication carrier with respect to each QCI. For example, it is possible that the service provider 4 makes "premium contracts" with respect to services corresponding to QCI "6" and QCI "7", and makes "general contracts" with respect to services corresponding to the other QCIs.

Figure 32:
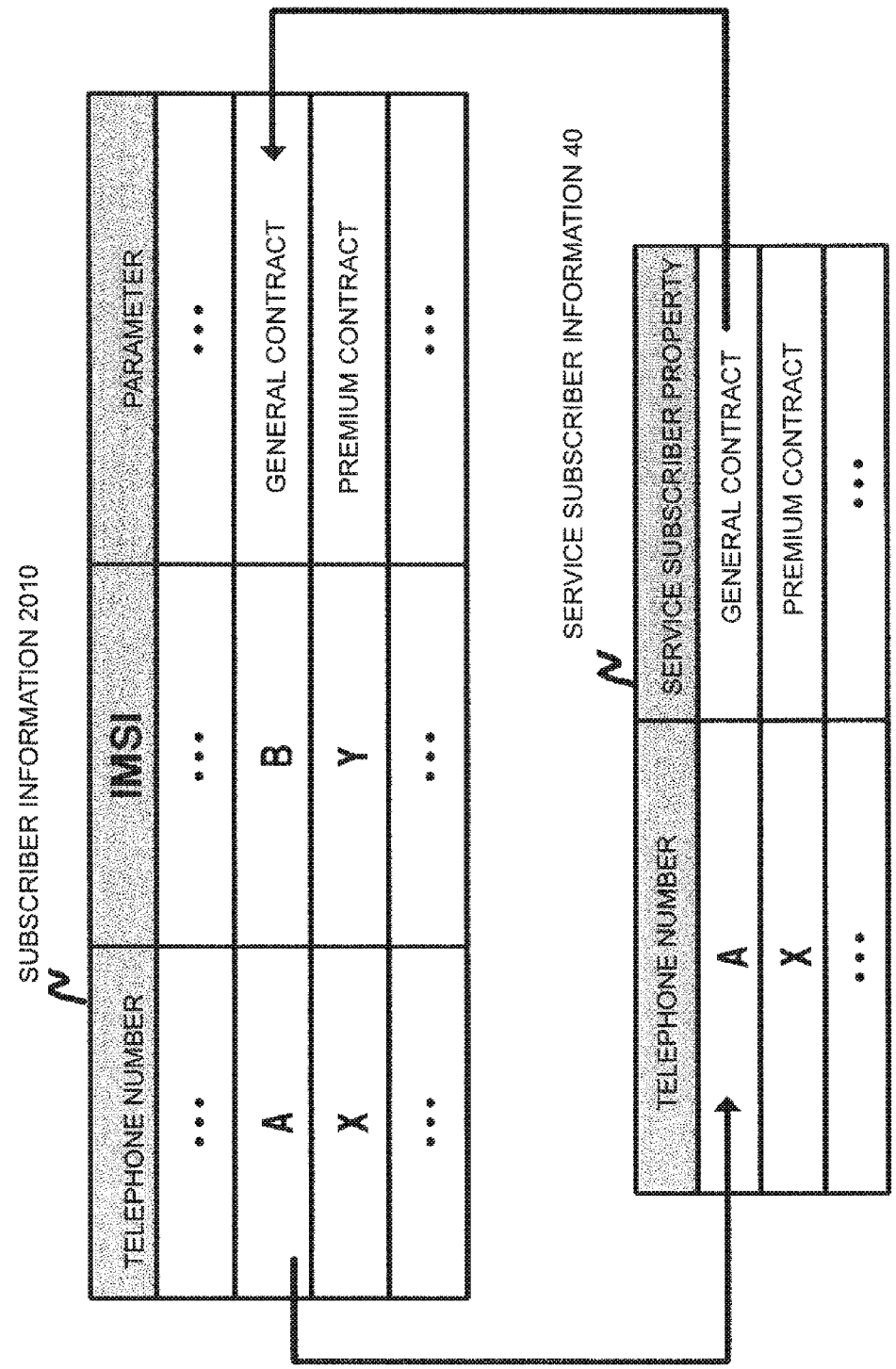
FIG. 32 is a schematic diagram showing an example of subscriber information in the sixth exemplary embodiment.

FIG. 32 shows an example of information provided from the service provider 4 to the communication carrier, and an example in which the communication carrier manages parameters related to the contracts between the provider 4 and users, based on the information provided from the provider 4.

For example, the service provider 4 acquires the telephone number of a terminal 1 from its user in making a contract with the user. For example, the service provider 4 manages the telephone number and the content of the contract as service subscriber information 40. The service provider 4 provides the service subscriber information 40 to the communication carrier. For example, the communication carrier, based on the provided service subscriber information 40, adds a parameter related to the content of the contract between the service provider 4 and the user, to subscriber information 2010 retained by an HSS 201 and an SPR 203. If the communication carrier provides services to a plurality of types of providers 4, the communication carrier only needs to manage parameters in the subscriber information 2010 for each service provider.

FIG. 33 shows an example of data set in a QoS information DB 21/QoS policy DB 32.

In the sixth exemplary embodiment, the priory levels of QoS information are set depending on a parameter (provider property) related to the content of a contract between a user and the service provider 4. For example, QoS information for parameter "premium contract" is set at a higher priority level than QoS information for "general contract". Note that in FIG. 33, parameter "N/A" is associated with QoS information for other users who make no contract with the service provider 4.

A parameter is notified to the communication apparatuses 2, for example, through the sequence illustrated in FIG. 17, 18 or 19. The communication apparatus 2 stores the notified parameter in the parameter management section 23, with it associated with a bearer ID. Moreover, for example, the control apparatus 3 or 3A having functionality as a NMS managing the communication apparatuses 2 and the like may notify a parameter to the communication apparatuses 2. That is, it is also possible that the communication apparatus 2 acquires a parameter from an apparatus other than those conforming to the specifications standardized by 3GPP and the like.

For example, the communication path identification information 20 of the communication apparatus 2 that is a P-GW, when receiving a packet addressed to the terminal 1 from the service provider 4, refers to information (e.g., Layer 3/Layer 4 information in the OSI reference model, such as an IP address and a port number) included in the received packet, thereby identifying a communication path to which the packet belongs. For example, when receiving a packet whose source address and destination address are the IP address of the provider 4 and the IP address of the terminal 1, respectively, the communication path identification section 20 determines that this packet belongs to a bearer related to a communication service provided from the service provider 4 to the terminal 1. The communication path identification section 20 refers to the parameter management section 23, identifies a parameter associated with the bearer related to the communication service provided from the provider 4 to the terminal 1, and adds QoS information selected based on the parameter and a QCI corresponding to the bearer to this packet.

7. Seventh Exemplary Embodiment

A seventh exemplary embodiment of the present invention will be described. The seventh exemplary embodiment can be applied to any of the techniques disclosed in the above-described first to sixth exemplary embodiments.

According to the seventh exemplary embodiment, the communication apparatus can perform communication quality control based on a parameter related to a MVNO (Mobile Virtual Network Operator) that uses a network operated by a communication carrier. A MVNO is a service provider that leases the network owned by a communication carrier from the communication carrier, which is a network operator, and provides communication services to users.

According to the seventh exemplary embodiment, for example, a communication carrier can perform communication quality control based on the content of a contract between a MVNO and the communication carrier. For example, in case where the MVNO makes a "premium contract", which agrees on a higher fee than a general contract, with the communication carrier, the communication carrier can perform communication quality control such that higher priority will be given to communication involved with the MVNO, which has made the "premium contract". That is, a communication service based on communication quality control for each MVNO can be a new source of revenue for a communication carrier.

7.1) System

Figure 34:
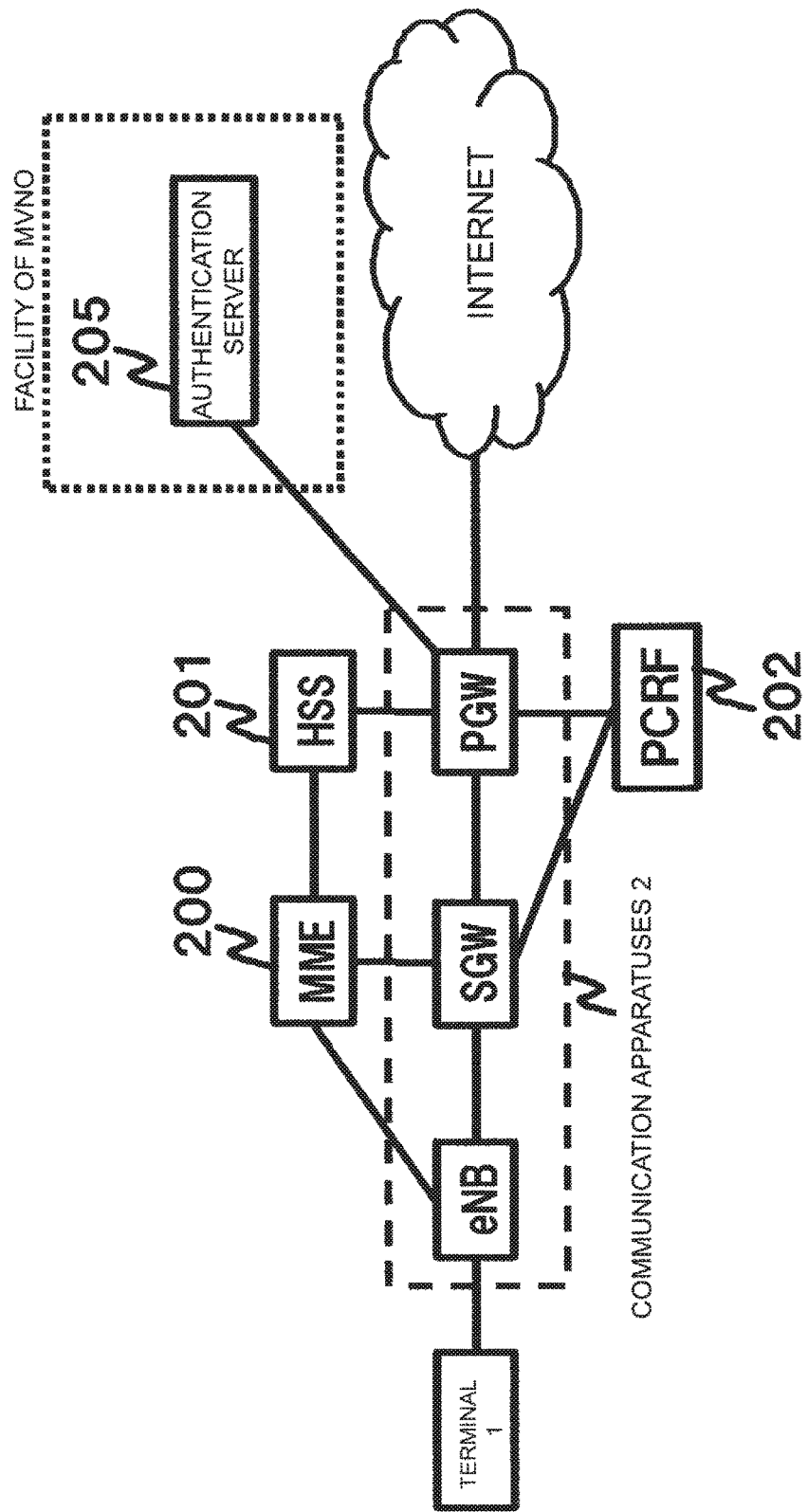
FIG. 34 is a diagram showing an example of the architecture of a communication system according to a seventh exemplary embodiment of the present invention.

FIG. 34 shows an example of the architecture of a communication system according to the seventh exemplary embodiment. The communication system according to the seventh exemplary embodiment includes an authentication server 205 operated by a MVNO. The other part of the architecture is similar to those of the above-described exemplary embodiments, and therefore a detailed description thereof will be omitted.

The authentication server 205 authenticates a terminal 1 when the terminal 1 accesses a network such as the Internet. For example, the authentication server 205 has a function of performing RADIUS (Remote Authentication Dial-In User Service) authentication.

FIGS. 35 and 36 show configuration examples of information stored in the QoS information DB 21/QoS policy DB 32. In the example of FIG. 35, the communication apparatus 2 can perform communication quality control based on an MVNO ID. Moreover, in the example of FIG. 36, communication quality control can be performed based on a parameter (MVNO property) related to a contract between a MVNO and the communication carrier. MVNO properties include, for example, a property ("premium") corresponding to a MVNO that has made a "premium contract" with the communication carrier and a property ("general") corresponding to a MVNO that has made a "general contract" with the communication carrier.

In the example of FIG. 35, a priority level for MVNO (A) is set lower than a priority level for MVNO (B). Moreover, in the example of FIG. 35, parameter "N/A" indicates that a communication associated with a bearer identified by the communication path identification section 20 is not a communication involved with a MVNO. For example, if a communication associated with a bearer identified by the communication path identification section 20 is a communication of a user who makes a contract not with a MVNO but with the communication carrier, its parameter is indicated with "N/A".

In the example of FIG. 36, in case of a MVNO property of "premium", a priority level for it is set higher than that of a MVNO property of "general". The meaning of parameter "N/A" is similar to that of the example of FIG. 35.

In the example of FIG. 36, the priority level of a communication involved with a MVNO that has made a "premium contract" with the communication carrier is set at the same level as the priority level (a DSCP value of "25") of a communication involved with the communication carrier. The present exemplary embodiment is not limited to the example of FIG. 36, but, for example, the priority level of a communication involved with a MVNO that has made a "premium contract" with the communication carrier may be set lower, or higher, than that of a communication involved with the communication carrier.

7.2) Operations

Figure 37:
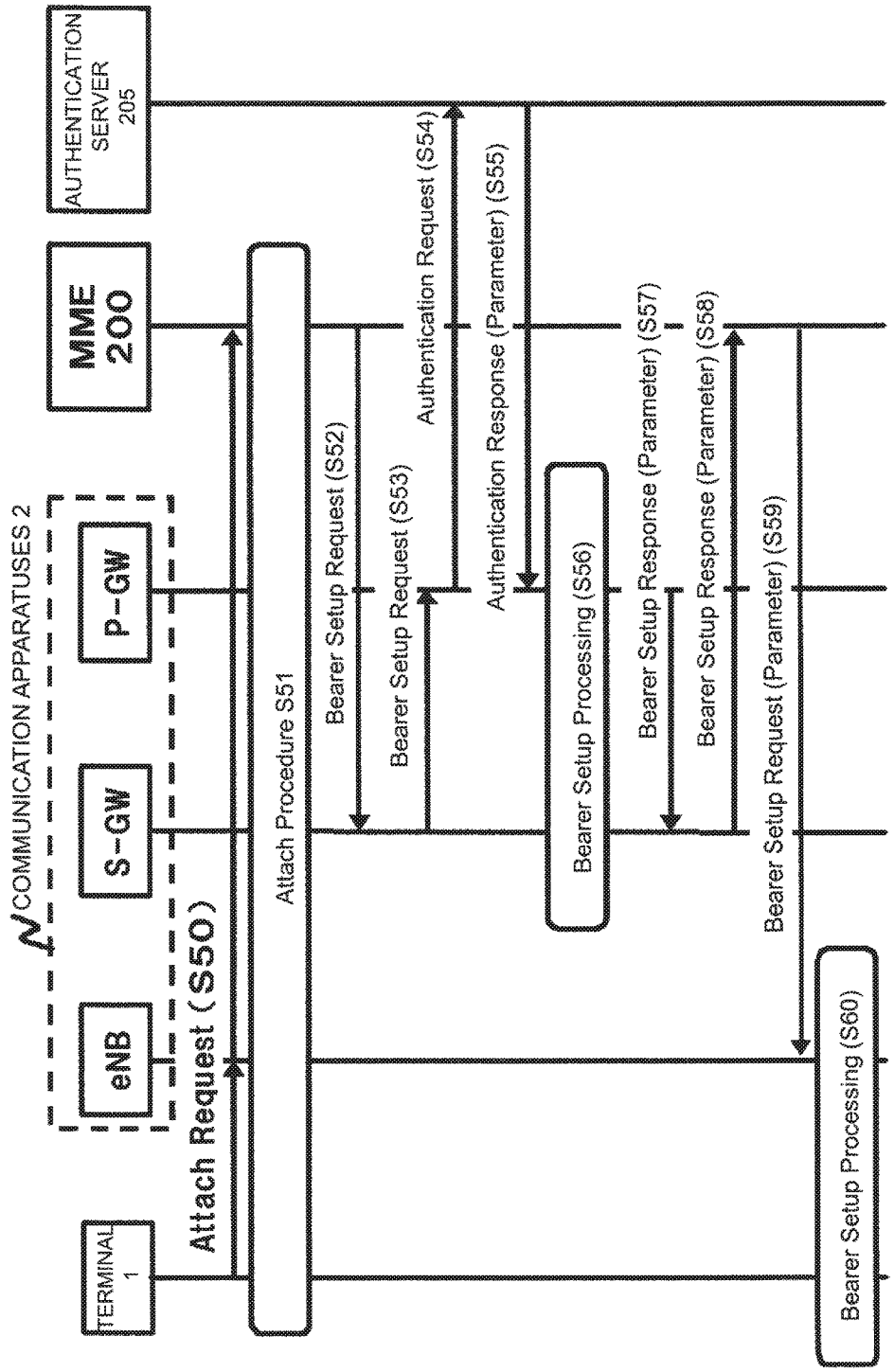
FIG. 37 is a sequence diagram showing an example of operations in the communication system according to the seventh exemplary embodiment.

A MVNO-related parameter is notified to the communication apparatuses 2, as illustrated in FIG. 37. Note that in the example of FIG. 37, the functions of the MME 200 are executed by the control section 31 of the control apparatus 3. Moreover, the respective functions of the P-GW, S-GW, and eNB are executed by the control sections 24 of the corresponding communication apparatuses 2, respectively.

Referring to FIG. 37, when the MME 200 receives an attach request from the terminal 1 via the eNB (Operation S50), an attach procedure is performed in the system (Operation S51). The attach procedure in Operation S50 is, for example, a procedure described in 3GPP (3rd Generation Partnership Project) specifications (TS23.401 v12.1.0), and a detailed description thereof will be omitted.

The MME 200 (the control section 31 of the control apparatus 3) selects an S-GW, assigns an EPS bearer ID corresponding to a bearer associated with the terminal 1 for the selected S-GW, and notifies this bearer ID and Information related to QoS (a QCI or the like) corresponding to this bearer to the S-GW by using a bearer setup request (Operation S52).

The S-GW (the control section 24 of a communication apparatus 2) notifies the bearer ID, Information related to QoS (a QCI or the like) corresponding to this bearer, and the like to the P-GW by using a bearer setup request (Operation S53).

The P-GW (the control section 24 of a communication apparatus 2) sends an authenticate request to the authentication server 205 (Operation S54). The authentication server 205 performs authentication processing and returns an authenticate response to the P-GW (Operation S 55). In the present exemplary embodiment, the authentication server 205 puts a parameter related to MVNO in the authenticate response and returns the authenticate response to the P-GW. The parameter related to MVNO is, for example, a MVNO ID, a parameter (MVNO property) related to a contract between the MVNO and the communication carrier, or the like. For example, the P-GW stores the parameter received from the authentication server 205 in the parameter management section 23, with it associated with the bearer ID.

After the above-described procedure, the P-GW and the S-GW perform bearer setup processing (Operation S56). The S-GW, for example, performs processing for setting up the bearer with the P-GW, and the P-GW, for example, performs processing for connecting to a PDN in coordination with the PCRF.

The P-GW (the control section 24 of the communication apparatus 2), upon completion of the bearer setup processing, sends a bearer setup response to the S-GW (Operation S57). In the present exemplary embodiment, the P-GW (the control section 24 of the communication apparatus 2) notifies the parameter received from the authentication server 205 to the S-GW by putting it in the bearer setup response. For example, the P-GW (the control section 24 of the communication apparatus 2) associates the parameter with the bearer ID and notifies them to the S-GW. For example, the S-GW stores the parameter received from the P-GW in the parameter management section 23, wherein the parameter is associated with the bearer ID.

The S-GW (the control section 24 of the communication apparatus 2) notifies a bearer setup response to the MME 200, with the parameter received from the P-GW included therein (Operation S58).

The MME 200 (the control section 31 of the control apparatus 3) sends a bearer setup request to the eNB, with the parameter related to MVNO included therein (Operation S59). For example, the MME 200 maps the parameter to the bearer ID and notifies them to the eNB. The eNB stores the received parameter in the parameter management section 23, with the parameter being associated with the bearer ID.

The eNB (the control section 24 of a communication apparatus 2), in response to the bearer setup request, sets up the radio bearer with the terminal 1 (Operation S60).

Through the above-described sequence, each communication apparatus 2 (P-GW, S-GW, and eNB) acquires the parameter for communication quality control.

For example, the communication path identification section 20 of the communication apparatus 2 serving as a P-GW determines that a packet whose destination address is the IP address of the terminal 1 subscribing to the MVNO belongs to a bearer involved with the MVNO. The communication path identification section 20 refers to the parameter management section 23 and identifies a parameter associated with the identified bearer. The packet processing section 22 adds to the packet QoS information selected based on the MVNO-related parameter and a QCI corresponding to the bearer.

Moreover, it is also possible that the control apparatus 3 or 3A having functionality as a NMS managing the communication apparatuses 2 and the like notifies a parameter to the communication apparatuses 2. That is, it is also possible that the communication apparatus 2 acquires a parameter from an apparatus other than those conforming to the specifications standardized by 3GPP and the like.

8. Eighth Exemplary Embodiment

An eighth exemplary embodiment of the present invention will be described. The eighth exemplary embodiment can be applied to any of the techniques disclosed in the above-described first to seventh exemplary embodiments.

The above-described exemplary embodiments show examples in which an apparatus serving as an endpoint of a bearer (for example, an apparatus terminating a bearer, such as eNB, S-GW, or P-GW) performs communication quality control. In the eighth exemplary embodiment, an apparatus different from an endpoint of a bearer performs communication quality control.

According to the eighth exemplary embodiment, a communication carrier can perform the above-described communication quality control, without making a change or modification by adding a function that is not prescribed by any specifications standardized by 3GPP or the like to an apparatus serving as an endpoint of a bearer.

Figure 38:
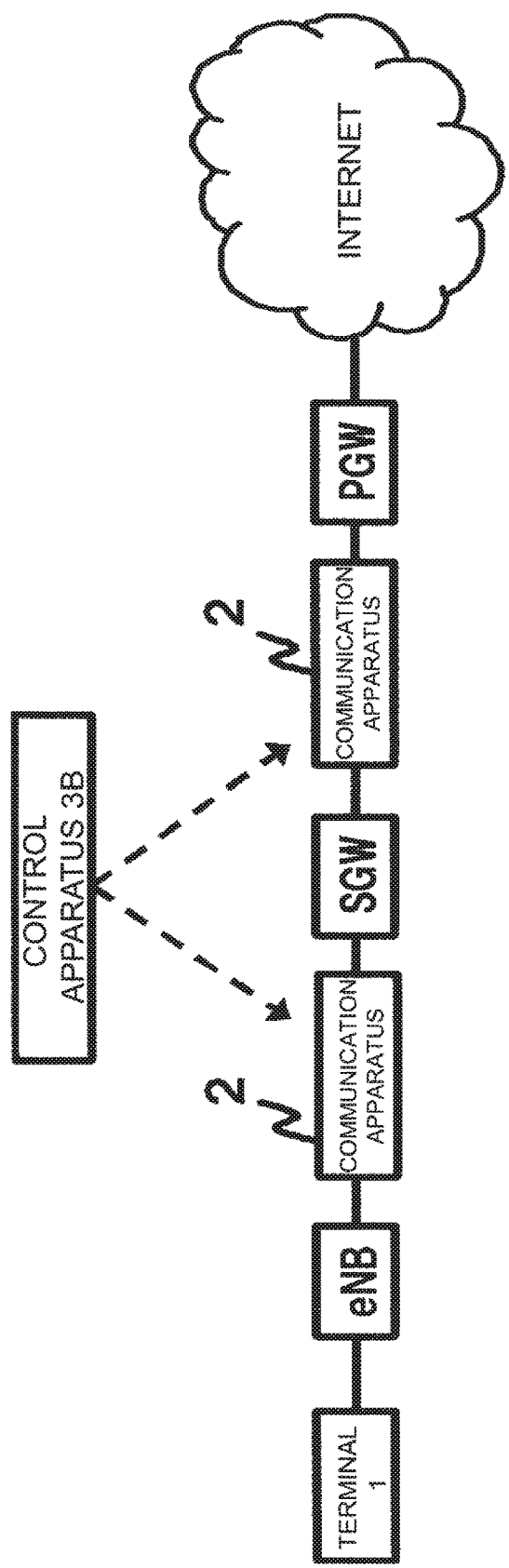
FIG. 38 is a diagram showing an example of the architecture of a communication system according to an eighth exemplary embodiment of the present invention.

FIG. 38 shows an example of the architecture of a communication system according to the eighth exemplary embodiment. The communication system according to the eighth exemplary embodiment includes a terminal 1, an eNB, an S-GW, a P-GW, communication apparatuses 2, and a control apparatus 3B. Note that in the eighth exemplary embodiment, the eNB, S-GW, and P-GW need not be configured to have the functions of the communication apparatus 2 illustrated in FIG. 2 or 16.

In the example of FIG. 38, a communication apparatus 2 is deployed in a network between the P-GW and the S-GW and in a network between the eNB and the S-GW. Note that a communication apparatus 2 need not be deployed in both the network between the P-GW and the S-GW and the network between the eNB and the S-GW, but it is sufficient that a communication apparatus 2 is deployed in at least any one of the networks.

The communication apparatuses 2 are deployed between apparatuses each serving as an endpoint of a bearer, as described above. Accordingly, the communication path identification section 20 of each communication apparatus 2 identifies a bearer of a packet sent from an endpoint of the bearer. The packet processing section 22 of the communication apparatus 2 adds QoS information to the packet sent from the endpoint of the bearer.

A packet associated with a bearer is encrypted by an IPsec gateway in some cases. In such a case, for example, a communication apparatus 2 is deployed at a location prior to a packet arriving at the IPsec gateway. For example, in a downlink communication path, a communication apparatus 2 is deployed between the P-GW and the IPsec gateway.

The control apparatus 3B sends a control signal to the communication apparatuses 2. The communication apparatuses 2 perform communication quality control based on the control signal sent from the control apparatus 3B.

Figure 39:
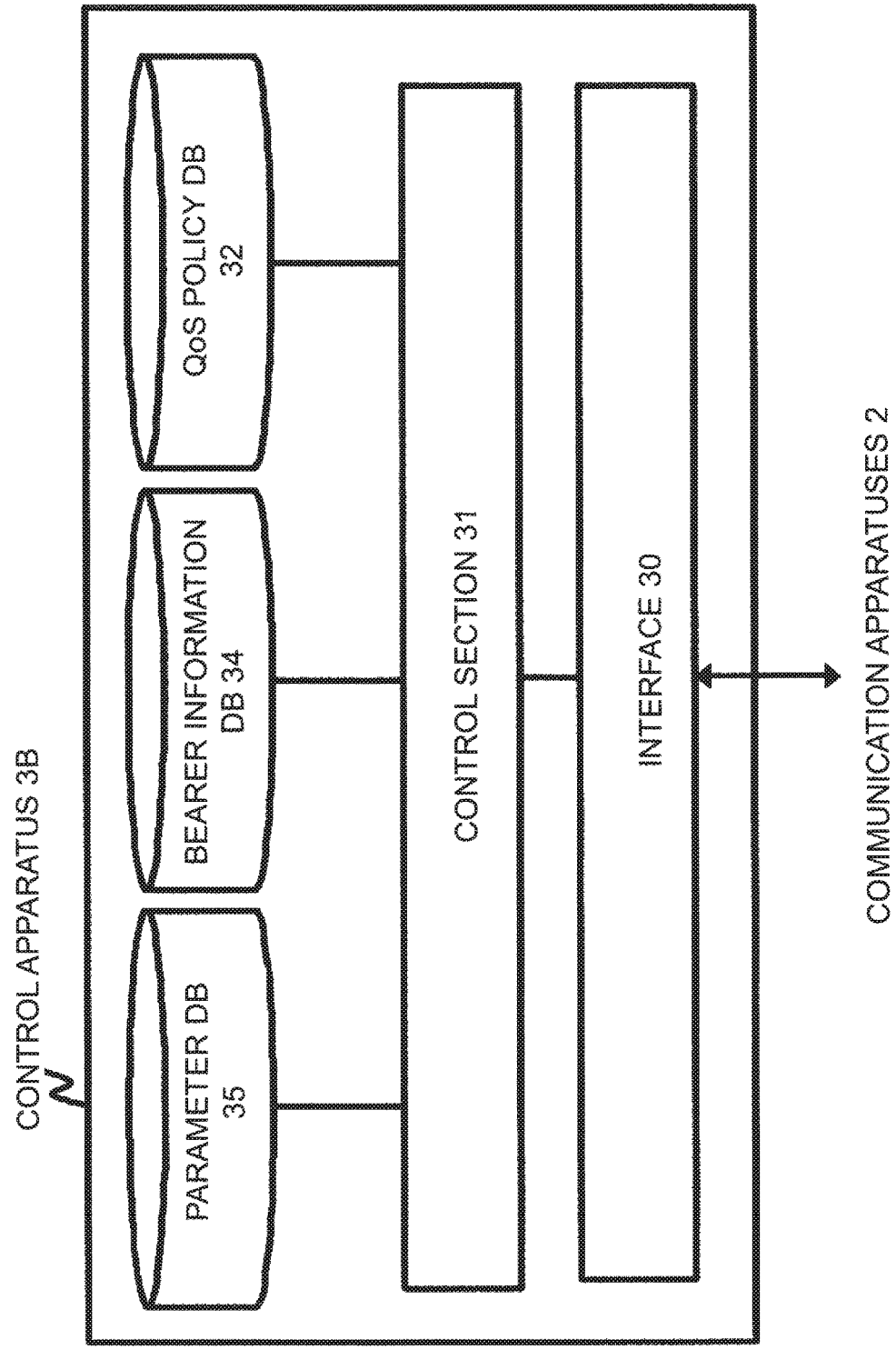
FIG. 39 is a block diagram showing an example of the configuration of a control apparatus according to the eighth exemplary embodiment.

FIG. 39 shows an example of the configuration of the control apparatus 3B. The control apparatus 3B includes a bearer information DB 34 and a parameter DB 35, in addition to the configuration of the control apparatus 3. The other blocks, namely, the interface 30, control section 31, and QoS policy DB 32 are as described already.

FIG. 40 shows an example of the configuration of a database retained by the bearer information DB 34. The bearer information DB 34 is a database for managing correspondences between bearer identification information, QCIs, and terminal IDs. Note that the bearer information DB 34 may be a database for managing correspondences between bearer identification information and terminal IDs. The bearer identification information is, for example, TEID. The terminal ID is, for example, IMSI (International Mobile Subscriber Identity). For example, the control apparatus 3B acquires information related to the bearer information DB 34 from the MME 200. Moreover, the control apparatus 3B may acquire information related to the bearer information DB 34 from each of the S-GW, P-GW, and eNB.

FIG. 41 shows an example of the configuration of the parameter DB 35. For example, the parameter DB 35 manages correspondences between parameters and terminal IDs (e.g., IMSI). For example, a communication carrier (a network operator) inputs a correspondence between terminal IDs and parameters to the parameter DB 35. Moreover, for example, a provider that provides network operation services to a communication carrier may input the correspondences between terminal IDs and parameters.

The control section 31 of the control apparatus 3B associates bearer identification information with a parameter, based on the bearer information DB 34 and the parameter DB 35. For example, the control section 31 uses a terminal ID as a key to retrieve bearer identification information associated with the terminal ID from the bearer information DB 34. The control section 31 uses that terminal ID as a key to retrieve a parameter associated with the terminal ID from the parameter DB 35. Through these operations, the control section 31 learns a correspondence between bearer identification information and parameters, as illustrated in FIG. 42.

In the example of FIG. 41, the parameter DB 35 is a database indicating the correspondence between terminal IDs and parameters. However, information to be associated with the parameters in the parameter DB 35 is not limited to terminal IDs. It is only necessary that information to be associated with the parameters should be information for linking the bearer identification information retained by the bearer information DB 34 with the parameters retained by the parameter DB 35.

For example, the control section 31 notifies the information stored in the QoS policy DB 32 to the communication apparatuses 2. The communication apparatus 2 stores the notified information in the QoS information DB 21.

The control section 31 notifies the correspondences between bearer identification information and parameters to the communication apparatuses 2. The communication apparatus 2 stores the notified information in the parameter management section 23. The communication apparatus 2 receives a packet sent from the eNB, S-GW, or P-GW and adds QoS information to this packet. A packet sent by the S-GW or P-GW is encapsulated with bearer identification information or the like. The communication path identification section 20 of the communication apparatus 2 identifies a bearer, based on the bearer identification information added to the packet. Moreover, the communication path identification information section 20 acquires a parameter from the parameter management section 23, based on the bearer identification information. The packet processing section 22 of the communication apparatus 2 retrieves QoS information to be added to the packet from the QoS information DB 21, based on the parameter. The packet processing section 22 adds the retrieved QoS information to the packet.

As described above, the communication apparatuses 2 deployed in the network between the P-GW and the S-GW and the network between the eNB and the S-GW perform communication quality control. Accordingly, in the eighth exemplary embodiment, the eNB, S-GW, or P-GW does not need to perform communication quality control based on a parameter as in the above-described exemplary embodiments.

9. Ninth Exemplary Embodiment

A ninth exemplary embodiment of the present invention will be described. The ninth exemplary embodiment can be applied to any of the techniques disclosed in the above-described first to eighth exemplary embodiments.

In the ninth exemplary embodiment, a communication carrier (a network operator), a provider that provides network operation services to a communication carrier, or the like performs network operation for communication quality control, which will be described later.

9.1) Management Apparatus

First Example

Figure 43:
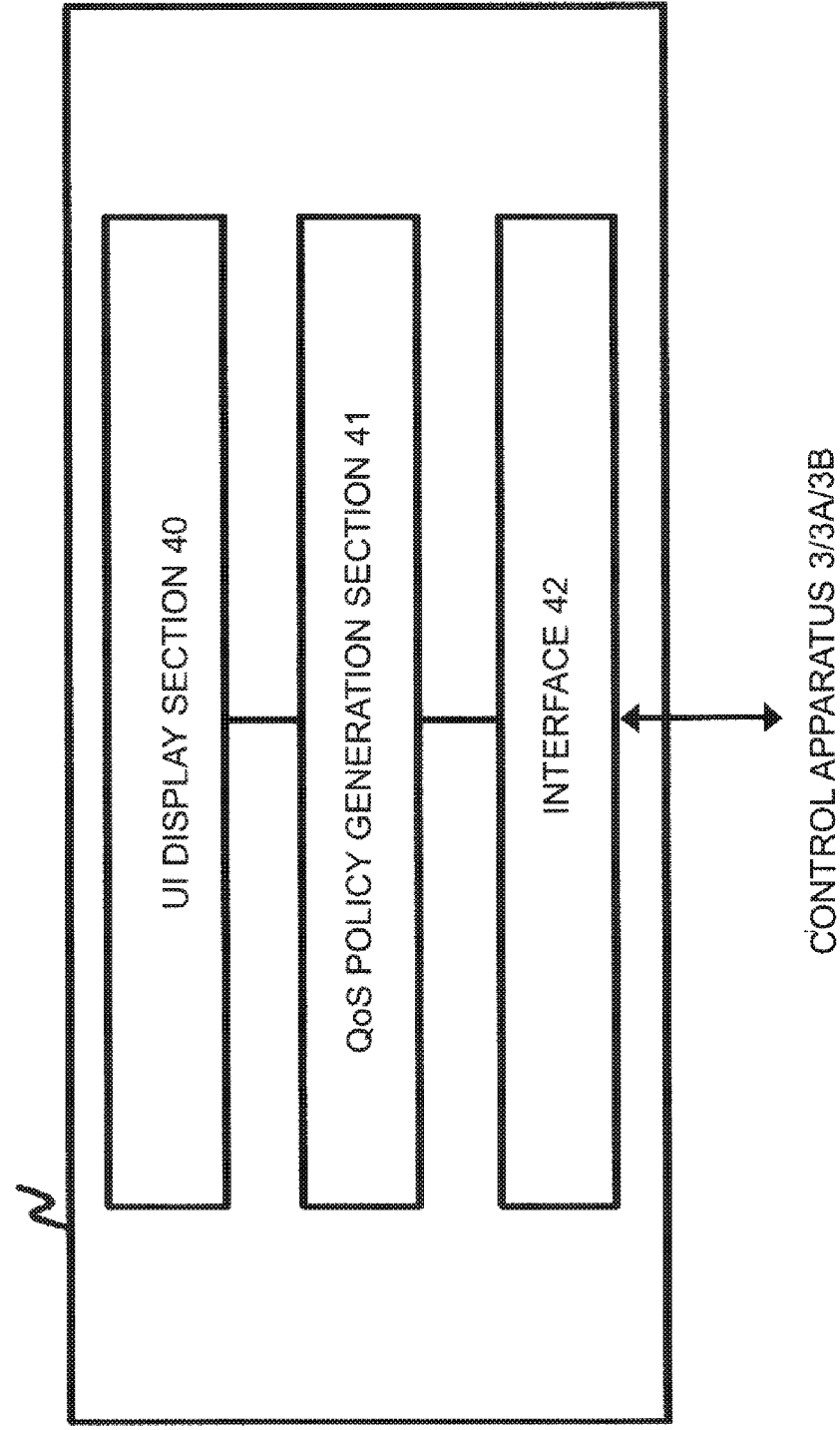
FIG. 43 is a block configuration diagram showing a first example of a management apparatus according to a ninth exemplary embodiment of the present invention.

FIG. 43 shows an example of the configuration of a management apparatus 4 used by a network operator, a provider that provides network operation services, or the like, which is an operation manager.

The management apparatus 4 includes a UI (User Interface) display section 40, a QoS policy generation section 41, an interface 42, and a control section (not shown) that controls the management operation of the management apparatus 4.

The UI display section 40 displays a user interface (hereinafter, abbreviated to UI) for the operation manager to input QoS polices for communication quality control into the system. For example, the operation manager inputs a plurality of pieces of quality information (e.g., DSCP values, CoS values, or the like) to be associated with QCIs, by using the UI.

The QoS policy generation section 41 generates a QoS policy based on the information input by the operation manager using the UI display section 40. For example, the QoS policy generation section 41 generates a QoS policy in which the plurality of pieces of quality information are associated with QCIs.

Note that the QoS policy generation section 41 may generate a QoS policy based on a predetermined policy, not depending on inputs from the operation manager. For example, the QoS policy generation section 41 may generate a QoS policy based on the policy described in the above-described exemplary embodiments with reference to FIG. 5 or 6. In this case, for example, the operation manager may use the UI display section 40 to input policies to be used for generation of QoS polices.

The management apparatus 4 notifies the QoS policy generated by the QoS policy generation section 41 to the control apparatus 3, 3A, or 3B via the interface 42. The control apparatus 3, 3A, or 3B stores the QoS policies notified from the management apparatus 4 in the QoS policy DB 32. The QoS policy DB 32 stores the plurality of pieces of QoS information, with them associated with QCIs.

The management apparatus 4 may notify the control apparatus 3, 3A, or 3B of a condition (a condition based on the source/destination IP address) for selecting associated quality information from among the plurality of pieces of quality information associated with QCIs. The control apparatus 3, 3A, or 3B notifies the condition for selecting quality information to the communication apparatuses 2.

Second Example

Figure 44:
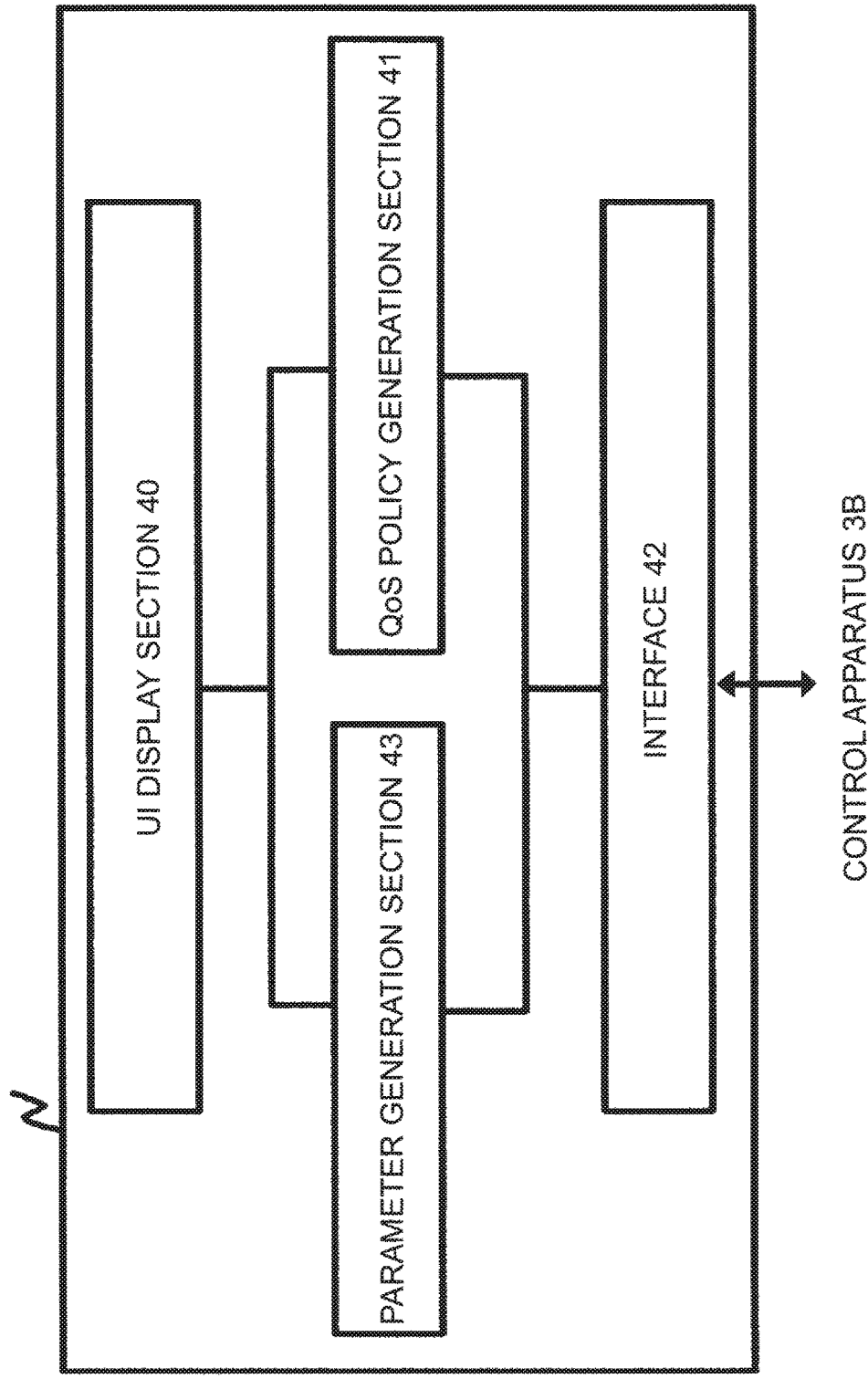
FIG. 44 is a block configuration diagram showing a second example of the management apparatus according to the ninth exemplary embodiment.

FIG. 44 shows another example of the configuration of the management apparatus 4. The management apparatus 4 may notify a parameter for selecting quality information to the control apparatus 3B, as described in the eighth exemplary embodiment.

Referring to FIG. 44, a parameter generation section 43 generates, for example, a database for managing correspondences between terminal IDs and parameters, based on information input by the operation manager using a UI display section 40. For example, the operation manager inputs a parameter such as a user property corresponding to each terminal, a service provider property corresponding to each terminal, or the like by using the UI display section 40. It is also possible that the operation manager inputs information to the management apparatus 4 from a database managing user properties, service provider properties, and the like. For example, the parameter generation section 43 generates a database indicating correspondences between terminal IDs and parameters as illustrated in FIG. 41.

However, information to be associated with the parameters is not limited to terminal IDs. It is only necessary that information to be associated with the parameters should be information for linking the bearer identification information retained by the bearer information DB 34 of the control apparatus 3B with the parameters. For example, information to be associated with the parameters by the parameter generation section 43 only needs to be bearer-related information such as bearer identification information.

Parameters notified by the parameter generation section 43 to the control apparatus 3B are, for example, any of the parameters illustrated in the above-described third to seventh exemplary embodiments.

The parameter generation section 43 notifies information indicating the correspondences between terminal IDs and parameters to the control apparatus 3B via the interface 42. The control apparatus 3B constructs the parameter DB 35, based on the notified information. The control apparatus 3B generates information to be notified to the parameter management sections 23 of the control apparatuses 2 (e.g., the information illustrated in FIG. 42), based on the parameter DB 35 and the bearer information DB 34.

9.2) Operations

Figure 45:
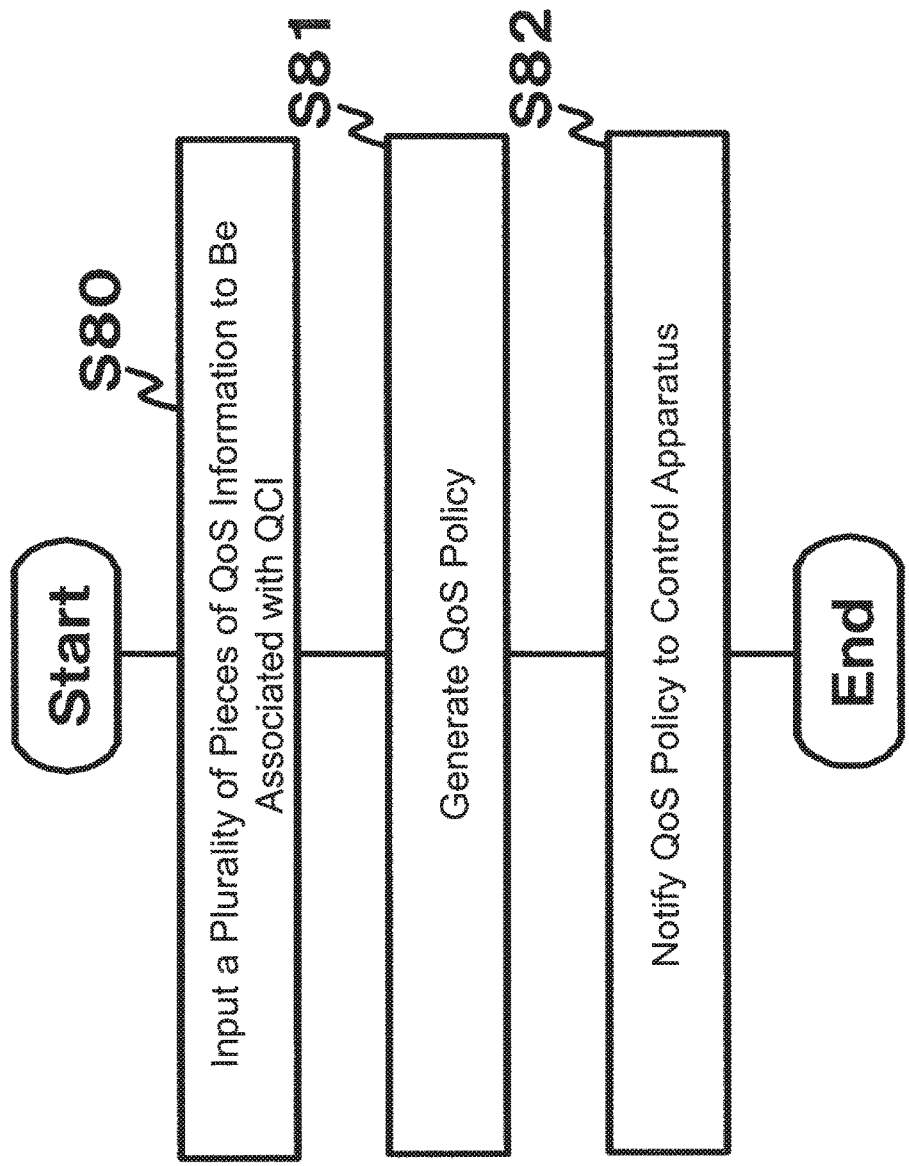
FIG. 45 is a flowchart showing an example of operations in the ninth exemplary embodiment.

FIG. 45 is a flowchart showing an example of operations in the ninth exemplary embodiment.

The operation manager inputs QoS information to be associated with QCI by using the UI displayed by the UI display section 40 (Operation S80).

The QoS policy generation section 41 generates a QoS policy based on the input information (S81).

The management apparatus 4 notifies the generated QoS policy to the control apparatus via the interface 42 (Operation S82).

Exemplary embodiments of the present invention have been described hereinabove. However, the present invention is not limited to the above-described individual exemplary embodiments. The present invention can be implemented based on modification of, substitution of, and/or adjustment to each exemplary embodiment. Moreover, the present invention can be also implemented by combining any of the exemplary embodiments. That is, the present invention incorporates the entire disclosure of the present description, and any types of modifications and adjustments thereof that can be implemented based on technical ideas.

REFERENCE SIGNS LIST

1 Terminal
2 Communication apparatus
20 Communication path identification section
21 QoS information DB
22 Packet processing section
23 Parameter management section
24 Control section
200 MME
201 HSS
2010 Subscriber information
202 PCRF
203 SPR
204 OCS
205 Authentication server
3 Control apparatus
30 Interface
31 Control section
32 QoS policy DB
33 Monitoring section
34 Bearer information DB
35 Parameter DB
4 Management apparatus
40 UI display section
41 QoS policy generation section
42 Interface
43 Parameter generation section

The invention claimed is:

1. A control apparatus, comprising:
   a memory storing a packet forwarding policy for processing a received packet to control communication quality on a communication path, wherein the packet forwarding policy includes a process instruction to add a quality identifier to the received packet; and
   a processor configured to execute program instructions to:
      identify, based on the communication path, a first path attribute and a second path attribute for the communication path;
      identify, based on the first path attribute and the second path attribute, the packet forwarding policy;
      send the packet forwarding policy to a switch apparatus on the communication path; and
      receive, from a management apparatus, a changing instruction to change one or both of the first path attribute and the second path attribute for the communication path.

2. The control apparatus according to claim 1, wherein the first path attribute has priority over the second path attribute.

3. The control apparatus according to claim 1, wherein the first path attribute represents a quality class of the communication path.

4. The control apparatus according to claim 3, wherein the second path attribute represents a level of traffic congestion.

5. The control apparatus according to claim 4, wherein the level of traffic congestion is monitored by a monitoring apparatus.

6. The control apparatus according to claim 1, wherein the second path attribute represents a service provided to a user.

7. The control apparatus according to claim 1, wherein the management apparatus is configured to manage user information.

8. A network system, comprising:
   a communication apparatus; and
   a control apparatus configured to control the communication apparatus, comprising:
      a memory storing a packet forwarding policy for processing a received packet to control communication quality on a communication path, wherein the packet forwarding policy includes a process instruction to add a quality identifier to the received packet; and
      a processor configured to execute program instructions to:
         identify, based on the communication path, a first path attribute and a second path attribute for the communication path;
         identify, based on the first path attribute and the second path attribute, the packet forwarding policy;
         send the packet forwarding policy to the communication apparatus on the communication path; and
         receive, from a management apparatus, a changing instruction to change one or both of the first path attribute and the second path attribute for the communication path.

9. The communication system according to claim 8, wherein the first path attribute has priority over the second path attribute.

10. The communication system according to claim 8, wherein the first path attribute represents a quality class of the communication path.

11. The communication system according to claim 8, wherein the management apparatus is configured to manage user information.

12. A network control method, comprising:
   identifying, based on a communication path, a first path attribute and a second path attribute for the communication path;

identifying, based on the first path attribute and the second path attribute, a packet forwarding policy which includes a process instruction to add a quality identifier to a received packet;

sending the packet forwarding policy to a switch apparatus on the communication path; and receiving, from a management apparatus, a changing instruction to change one or both of the first path attribute and the second path attribute for the communication path.

13. The network control method according to claim 12, wherein the first path attribute has priority over the second path attribute.

14. The network control method according to claim 12, wherein the management apparatus is configured to manage user information.

* * * * *